United States Patent
Khalid et al.

(10) Patent No.: US 10,893,068 B1
(45) Date of Patent: Jan. 12, 2021

(54) RANSOMWARE FILE MODIFICATION PREVENTION TECHNIQUE

(71) Applicant: FireEye, Inc., Milpitas, CA (US)

(72) Inventors: Yasir Khalid, Fremont, CA (US);
Nadeem Shahbaz, Fremont, CA (US);
Raghunath Konda, Fremont, CA (US)

(73) Assignee: FireEye, Inc., Milpitas, CA (US)

( * ) Notice: Subject to any disclaimer, the term of this patent is extended or adjusted under 35 U.S.C. 154(b) by 237 days.

(21) Appl. No.: 16/024,708

(22) Filed: Jun. 29, 2018

Related U.S. Application Data

(60) Provisional application No. 62/527,964, filed on Jun. 30, 2017.

(51) Int. Cl.

| | |
|---|---|
| *H04L 29/06* | (2006.01) |
| *G06F 21/55* | (2013.01) |
| *G06F 21/56* | (2013.01) |
| *G06K 9/62* | (2006.01) |
| *G06F 9/455* | (2018.01) |
| *G06F 11/34* | (2006.01) |

(52) U.S. Cl.
CPC ........ *H04L 63/145* (2013.01); *G06F 9/45558* (2013.01); *G06F 11/3409* (2013.01); *G06F 21/554* (2013.01); *G06F 21/565* (2013.01); *G06F 21/566* (2013.01); *G06K 9/6267* (2013.01); *G06F 2201/81* (2013.01); *G06F 2201/86* (2013.01)

(58) Field of Classification Search
CPC ............... H04L 63/145; G06F 9/45558; G06F 11/3409; G06F 21/554; G06F 21/565; G06F 21/566; G06F 2201/81; G06F 2201/86; G06K 9/6267

USPC ......................................................... 726/23
See application file for complete search history.

(56) References Cited

U.S. PATENT DOCUMENTS

| | | |
|---|---|---|
| 4,292,580 A | 9/1981 | Ott et al. |
| 5,175,732 A | 12/1992 | Hendel et al. |
| 5,319,776 A | 6/1994 | Hile et al. |
| 5,440,723 A | 8/1995 | Arnold et al. |
| 5,490,249 A | 2/1996 | Miller |
| 5,657,473 A | 8/1997 | Killean et al. |
| 5,802,277 A | 9/1998 | Cowlard |
| 5,842,002 A | 11/1998 | Schnurer et al. |
| 5,960,170 A | 9/1999 | Chen et al. |
| 5,978,917 A | 11/1999 | Chi |
| 5,983,348 A | 11/1999 | Ji |

(Continued)

FOREIGN PATENT DOCUMENTS

| | | |
|---|---|---|
| GB | 2439806 A | 1/2008 |
| GB | 2490431 A | 10/2012 |

(Continued)

OTHER PUBLICATIONS

Venezia, Paul, "NetDetector Captures Intrusions", InfoWorld Issue 27, ("Venezia"), (Jul. 14, 2003).

(Continued)

*Primary Examiner* — Michael S McNally
(74) *Attorney, Agent, or Firm* — Rutan & Tucker, LLP

(57) ABSTRACT

A computerized system and method to detect ransomware cyber-attacks is described. The approach entails analyzing the features associated with a file access event by a process operating on a computing device, to ascertain whether the process is associated with a ransomware cyber-attack.

26 Claims, 3 Drawing Sheets

(56) References Cited

U.S. PATENT DOCUMENTS

| | | |
|---|---|---|
| 6,088,803 A | 7/2000 | Tso et al. |
| 6,092,194 A | 7/2000 | Touboul |
| 6,094,677 A | 7/2000 | Capek et al. |
| 6,108,799 A | 8/2000 | Boulay et al. |
| 6,154,844 A | 11/2000 | Touboul et al. |
| 6,269,330 B1 | 7/2001 | Cidon et al. |
| 6,272,641 B1 | 8/2001 | Ji |
| 6,279,113 B1 | 8/2001 | Vaidya |
| 6,298,445 B1 | 10/2001 | Shostack et al. |
| 6,357,008 B1 | 3/2002 | Nachenberg |
| 6,424,627 B1 | 7/2002 | Sorhaug et al. |
| 6,442,696 B1 | 8/2002 | Wray et al. |
| 6,484,315 B1 | 11/2002 | Ziese |
| 6,487,666 B1 | 11/2002 | Shanklin et al. |
| 6,493,756 B1 | 12/2002 | O'Brien et al. |
| 6,550,012 B1 | 4/2003 | Villa et al. |
| 6,775,657 B1 | 8/2004 | Baker |
| 6,831,893 B1 | 12/2004 | Ben Nun et al. |
| 6,832,367 B1 | 12/2004 | Choi et al. |
| 6,895,550 B2 | 5/2005 | Kanchirayappa et al. |
| 6,898,632 B2 | 5/2005 | Gordy et al. |
| 6,907,396 B1 | 6/2005 | Muttik et al. |
| 6,941,348 B2 | 9/2005 | Petry et al. |
| 6,971,097 B1 | 11/2005 | Wallman |
| 6,981,279 B1 | 12/2005 | Arnold et al. |
| 7,007,107 B1 | 2/2006 | Ivchenko et al. |
| 7,028,179 B2 | 4/2006 | Anderson et al. |
| 7,043,757 B2 | 5/2006 | Hoefelmeyer et al. |
| 7,058,822 B2 | 6/2006 | Edery et al. |
| 7,069,316 B1 | 6/2006 | Gryaznov |
| 7,080,407 B1 | 7/2006 | Zhao et al. |
| 7,080,408 B1 | 7/2006 | Pak et al. |
| 7,093,002 B2 | 8/2006 | Wolff et al. |
| 7,093,239 B1 | 8/2006 | van der Made |
| 7,096,498 B2 | 8/2006 | Judge |
| 7,100,201 B2 | 8/2006 | Izatt |
| 7,107,617 B2 | 9/2006 | Hursey et al. |
| 7,159,149 B2 | 1/2007 | Spiegel et al. |
| 7,213,260 B2 | 5/2007 | Judge |
| 7,231,667 B2 | 6/2007 | Jordan |
| 7,240,364 B1 | 7/2007 | Branscomb et al. |
| 7,240,368 B1 | 7/2007 | Roesch et al. |
| 7,243,371 B1 | 7/2007 | Kasper et al. |
| 7,249,175 B1 | 7/2007 | Donaldson |
| 7,287,278 B2 | 10/2007 | Liang |
| 7,308,716 B2 | 12/2007 | Danford et al. |
| 7,328,453 B2 | 2/2008 | Merkle, Jr. et al. |
| 7,346,486 B2 | 3/2008 | Ivancic et al. |
| 7,356,736 B2 | 4/2008 | Natvig |
| 7,386,888 B2 | 6/2008 | Liang et al. |
| 7,392,542 B2 | 6/2008 | Bucher |
| 7,418,729 B2 | 8/2008 | Szor |
| 7,428,300 B1 | 9/2008 | Drew et al. |
| 7,441,272 B2 | 10/2008 | Durham et al. |
| 7,448,084 B1 | 11/2008 | Apap et al. |
| 7,458,098 B2 | 11/2008 | Judge et al. |
| 7,464,404 B2 | 12/2008 | Carpenter et al. |
| 7,464,407 B2 | 12/2008 | Nakae et al. |
| 7,467,408 B2 | 12/2008 | O'Toole, Jr. |
| 7,478,428 B1 | 1/2009 | Thomlinson |
| 7,480,773 B1 | 1/2009 | Reed |
| 7,487,543 B2 | 2/2009 | Arnold et al. |
| 7,496,960 B1 | 2/2009 | Chen et al. |
| 7,496,961 B2 | 2/2009 | Zimmer et al. |
| 7,519,990 B1 | 4/2009 | Xie |
| 7,523,493 B2 | 4/2009 | Liang et al. |
| 7,530,104 B1 | 5/2009 | Thrower et al. |
| 7,540,025 B2 | 5/2009 | Tzadikario |
| 7,546,638 B2 | 6/2009 | Anderson et al. |
| 7,565,550 B2 | 7/2009 | Liang et al. |
| 7,568,233 B1 | 7/2009 | Szor et al. |
| 7,584,455 B2 | 9/2009 | Ball |
| 7,603,715 B2 | 10/2009 | Costa et al. |
| 7,607,171 B1 | 10/2009 | Marsden et al. |
| 7,639,714 B2 | 12/2009 | Stolfo et al. |
| 7,644,441 B2 | 1/2010 | Schmid et al. |
| 7,657,419 B2 | 2/2010 | van der Made |
| 7,676,841 B2 | 3/2010 | Sobchuk et al. |
| 7,698,548 B2 | 4/2010 | Shelest et al. |
| 7,707,633 B2 | 4/2010 | Danford et al. |
| 7,712,136 B2 | 5/2010 | Sprosts et al. |
| 7,730,011 B1 | 6/2010 | Deninger et al. |
| 7,739,740 B1 | 6/2010 | Nachenberg et al. |
| 7,779,463 B2 | 8/2010 | Stolfo et al. |
| 7,784,097 B1 | 8/2010 | Stolfo et al. |
| 7,832,008 B1 | 11/2010 | Kraemer |
| 7,836,502 B1 | 11/2010 | Zhao et al. |
| 7,849,506 B1 | 12/2010 | Dansey et al. |
| 7,854,007 B2 | 12/2010 | Sprosts et al. |
| 7,869,073 B2 | 1/2011 | Oshima |
| 7,877,803 B2 | 1/2011 | Enstone et al. |
| 7,904,959 B2 | 3/2011 | Sidiroglou et al. |
| 7,908,660 B2 | 3/2011 | Bahl |
| 7,930,738 B1 | 4/2011 | Petersen |
| 7,937,387 B2 | 5/2011 | Frazier et al. |
| 7,937,761 B1 | 5/2011 | Bennett |
| 7,949,849 B2 | 5/2011 | Lowe et al. |
| 7,996,556 B2 | 8/2011 | Raghavan et al. |
| 7,996,836 B1 | 8/2011 | McCorkendale et al. |
| 7,996,904 B1 | 8/2011 | Chiueh et al. |
| 7,996,905 B2 | 8/2011 | Arnold et al. |
| 8,006,305 B2 | 8/2011 | Aziz |
| 8,010,667 B2 | 8/2011 | Zhang et al. |
| 8,020,206 B2 | 9/2011 | Hubbard et al. |
| 8,028,338 B1 | 9/2011 | Schneider et al. |
| 8,042,184 B1 | 10/2011 | Batenin |
| 8,045,094 B2 | 10/2011 | Teragawa |
| 8,045,458 B2 | 10/2011 | Alperovitch et al. |
| 8,069,484 B2 | 11/2011 | McMillan et al. |
| 8,087,086 B1 | 12/2011 | Lai et al. |
| 8,171,553 B2 | 5/2012 | Aziz et al. |
| 8,176,049 B2 | 5/2012 | Deninger et al. |
| 8,176,480 B1 | 5/2012 | Spertus |
| 8,201,246 B1 | 6/2012 | Wu et al. |
| 8,204,984 B1 | 6/2012 | Aziz et al. |
| 8,214,905 B1 | 7/2012 | Doukhvalov et al. |
| 8,220,055 B1 | 7/2012 | Kennedy |
| 8,225,288 B2 | 7/2012 | Miller et al. |
| 8,225,373 B2 | 7/2012 | Kraemer |
| 8,233,882 B2 | 7/2012 | Rogel |
| 8,234,640 B1 | 7/2012 | Fitzgerald et al. |
| 8,234,709 B2 | 7/2012 | Viljoen et al. |
| 8,239,944 B1 | 8/2012 | Nachenberg et al. |
| 8,260,914 B1 | 9/2012 | Ranjan |
| 8,266,091 B1 | 9/2012 | Gubin et al. |
| 8,286,251 B2 | 10/2012 | Eker et al. |
| 8,291,499 B2 | 10/2012 | Aziz et al. |
| 8,307,435 B1 | 11/2012 | Mann et al. |
| 8,307,443 B2 | 11/2012 | Wang et al. |
| 8,312,545 B2 | 11/2012 | Tuvell et al. |
| 8,321,936 B1 | 11/2012 | Green et al. |
| 8,321,941 B2 | 11/2012 | Tuvell et al. |
| 8,332,571 B1 | 12/2012 | Edwards, Sr. |
| 8,365,286 B2 | 1/2013 | Poston |
| 8,365,297 B1 | 1/2013 | Parshin et al. |
| 8,370,938 B1 | 2/2013 | Daswani et al. |
| 8,370,939 B2 | 2/2013 | Zaitsev et al. |
| 8,375,444 B2 | 2/2013 | Aziz et al. |
| 8,381,299 B2 | 2/2013 | Stolfo et al. |
| 8,402,529 B1 | 3/2013 | Green et al. |
| 8,464,340 B2 | 6/2013 | Ahn et al. |
| 8,479,174 B2 | 7/2013 | Chiriac |
| 8,479,276 B1 | 7/2013 | Vaystikh et al. |
| 8,479,291 B1 | 7/2013 | Bodke |
| 8,510,827 B1 | 8/2013 | Leake et al. |
| 8,510,828 B1 | 8/2013 | Guo et al. |
| 8,510,842 B2 | 8/2013 | Amit et al. |
| 8,516,478 B1 | 8/2013 | Edwards et al. |
| 8,516,590 B1 | 8/2013 | Ranadive et al. |
| 8,516,593 B2 | 8/2013 | Aziz |
| 8,522,348 B2 | 8/2013 | Chen et al. |
| 8,528,086 B1 | 9/2013 | Aziz |
| 8,533,824 B2 | 9/2013 | Hutton et al. |
| 8,539,582 B1 | 9/2013 | Aziz et al. |

(56) References Cited

U.S. PATENT DOCUMENTS

| | | |
|---|---|---|
| 8,549,638 B2 | 10/2013 | Aziz |
| 8,555,391 B1 | 10/2013 | Demir et al. |
| 8,561,177 B1 | 10/2013 | Aziz et al. |
| 8,566,476 B2 | 10/2013 | Shiffer et al. |
| 8,566,946 B1 | 10/2013 | Aziz et al. |
| 8,584,094 B2 | 11/2013 | Dadhia et al. |
| 8,584,234 B1 | 11/2013 | Sobel et al. |
| 8,584,239 B2 | 11/2013 | Aziz et al. |
| 8,595,834 B2 | 11/2013 | Xie et al. |
| 8,627,476 B1 | 1/2014 | Satish et al. |
| 8,635,696 B1 | 1/2014 | Aziz |
| 8,682,054 B2 | 3/2014 | Xue et al. |
| 8,682,812 B1 | 3/2014 | Ranjan |
| 8,689,333 B2 | 4/2014 | Aziz |
| 8,695,096 B1 | 4/2014 | Zhang |
| 8,713,631 B1 | 4/2014 | Pavlyushchik |
| 8,713,681 B2 | 4/2014 | Silberman et al. |
| 8,726,392 B1 | 5/2014 | McCorkendale et al. |
| 8,739,280 B2 | 5/2014 | Chess et al. |
| 8,776,229 B1 | 7/2014 | Aziz |
| 8,782,792 B1 | 7/2014 | Bodke |
| 8,789,172 B2 | 7/2014 | Stolfo et al. |
| 8,789,178 B2 | 7/2014 | Kejriwal et al. |
| 8,793,278 B2 | 7/2014 | Frazier et al. |
| 8,793,787 B2 | 7/2014 | Ismael et al. |
| 8,805,947 B1 | 8/2014 | Kuzkin et al. |
| 8,806,647 B1 | 8/2014 | Daswani et al. |
| 8,832,829 B2 | 9/2014 | Manni et al. |
| 8,850,570 B1 | 9/2014 | Ramzan |
| 8,850,571 B2 | 9/2014 | Staniford et al. |
| 8,881,234 B2 | 11/2014 | Narasimhan et al. |
| 8,881,271 B2 | 11/2014 | Butler, II |
| 8,881,282 B1 | 11/2014 | Aziz et al. |
| 8,898,788 B1 | 11/2014 | Aziz et al. |
| 8,935,779 B2 | 1/2015 | Manni et al. |
| 8,949,257 B2 | 2/2015 | Shiffer et al. |
| 8,984,638 B1 | 3/2015 | Aziz et al. |
| 8,990,939 B2 | 3/2015 | Staniford et al. |
| 8,990,944 B1 | 3/2015 | Singh et al. |
| 8,997,219 B2 | 3/2015 | Staniford et al. |
| 9,009,822 B1 | 4/2015 | Ismael et al. |
| 9,009,823 B1 | 4/2015 | Ismael et al. |
| 9,027,135 B1 | 5/2015 | Aziz |
| 9,071,638 B1 | 6/2015 | Aziz et al. |
| 9,104,867 B1 | 8/2015 | Thioux et al. |
| 9,106,630 B2 | 8/2015 | Frazier et al. |
| 9,106,694 B2 | 8/2015 | Aziz et al. |
| 9,118,715 B2 | 8/2015 | Staniford et al. |
| 9,159,035 B1 | 10/2015 | Ismael et al. |
| 9,171,160 B2 | 10/2015 | Vincent et al. |
| 9,176,843 B1 | 11/2015 | Ismael et al. |
| 9,189,627 B1 | 11/2015 | Islam |
| 9,195,829 B1 | 11/2015 | Goradia et al. |
| 9,197,664 B1 | 11/2015 | Aziz et al. |
| 9,223,972 B1 | 12/2015 | Vincent et al. |
| 9,225,740 B1 | 12/2015 | Ismael et al. |
| 9,241,010 B1 | 1/2016 | Bennett et al. |
| 9,251,343 B1 | 2/2016 | Vincent et al. |
| 9,262,635 B2 | 2/2016 | Paithane et al. |
| 9,268,936 B2 | 2/2016 | Butler |
| 9,275,229 B2 | 3/2016 | LeMasters |
| 9,282,109 B1 | 3/2016 | Aziz et al. |
| 9,292,686 B2 | 3/2016 | Ismael et al. |
| 9,294,501 B2 | 3/2016 | Mesdaq et al. |
| 9,300,686 B2 | 3/2016 | Pidathala et al. |
| 9,306,960 B1 | 4/2016 | Aziz |
| 9,306,974 B1 | 4/2016 | Aziz et al. |
| 9,311,479 B1 | 4/2016 | Manni et al. |
| 9,355,247 B1 | 5/2016 | Thioux et al. |
| 9,356,944 B1 | 5/2016 | Aziz |
| 9,363,280 B1 | 6/2016 | Rivlin et al. |
| 9,367,681 B1 | 6/2016 | Ismael et al. |
| 9,398,028 B1 | 7/2016 | Karandikar et al. |
| 9,413,781 B2 | 8/2016 | Cunningham et al. |
| 9,426,071 B1 | 8/2016 | Caldejon et al. |
| 9,430,646 B1 | 8/2016 | Mushtaq et al. |
| 9,432,389 B1 | 8/2016 | Khalid et al. |
| 9,438,613 B1 | 9/2016 | Paithane et al. |
| 9,438,622 B1 | 9/2016 | Staniford et al. |
| 9,438,623 B1 | 9/2016 | Thioux et al. |
| 9,459,901 B2 | 10/2016 | Jung et al. |
| 9,467,460 B1 | 10/2016 | Otvagin et al. |
| 9,483,644 B1 | 11/2016 | Paithane et al. |
| 9,495,180 B2 | 11/2016 | Ismael |
| 9,497,213 B2 | 11/2016 | Thompson et al. |
| 9,507,935 B2 | 11/2016 | Ismael et al. |
| 9,516,057 B2 | 12/2016 | Aziz |
| 9,519,782 B2 | 12/2016 | Aziz et al. |
| 9,536,091 B2 | 1/2017 | Paithane et al. |
| 9,537,972 B1 | 1/2017 | Edwards et al. |
| 9,560,059 B1 | 1/2017 | Islam |
| 9,565,202 B1 | 2/2017 | Kindlund et al. |
| 9,591,015 B1 | 3/2017 | Amin et al. |
| 9,591,020 B1 | 3/2017 | Aziz |
| 9,594,904 B1 | 3/2017 | Jain et al. |
| 9,594,905 B1 | 3/2017 | Ismael et al. |
| 9,594,912 B1 | 3/2017 | Thioux et al. |
| 9,609,007 B1 | 3/2017 | Rivlin et al. |
| 9,626,509 B1 | 4/2017 | Khalid et al. |
| 9,628,498 B1 | 4/2017 | Aziz et al. |
| 9,628,507 B2 | 4/2017 | Haq et al. |
| 9,633,134 B2 | 4/2017 | Ross |
| 9,635,039 B1 | 4/2017 | Islam et al. |
| 9,641,546 B1 | 5/2017 | Manni et al. |
| 9,654,485 B1 | 5/2017 | Neumann |
| 9,661,009 B1 | 5/2017 | Karandikar et al. |
| 9,661,018 B1 | 5/2017 | Aziz |
| 9,674,298 B1 | 6/2017 | Edwards et al. |
| 9,680,862 B2 | 6/2017 | Ismael et al. |
| 9,690,606 B1 | 6/2017 | Ha et al. |
| 9,690,933 B1 | 6/2017 | Singh et al. |
| 9,690,935 B2 | 6/2017 | Shiffer et al. |
| 9,690,936 B1 | 6/2017 | Malik et al. |
| 9,736,179 B2 | 8/2017 | Ismael |
| 9,740,857 B2 | 8/2017 | Ismael et al. |
| 9,747,446 B1 | 8/2017 | Pidathala et al. |
| 9,756,074 B2 | 9/2017 | Aziz et al. |
| 9,773,112 B1 | 9/2017 | Rathor et al. |
| 9,781,144 B1 | 10/2017 | Otvagin et al. |
| 9,787,700 B1 | 10/2017 | Amin et al. |
| 9,787,706 B1 | 10/2017 | Otvagin et al. |
| 9,792,196 B1 | 10/2017 | Ismael et al. |
| 9,824,209 B1 | 11/2017 | Ismael et al. |
| 9,824,211 B2 | 11/2017 | Wilson |
| 9,824,216 B1 | 11/2017 | Khalid et al. |
| 9,825,976 B1 | 11/2017 | Gomez et al. |
| 9,825,989 B1 | 11/2017 | Mehra et al. |
| 9,838,408 B1 | 12/2017 | Karandikar et al. |
| 9,838,411 B1 | 12/2017 | Aziz |
| 9,838,416 B1 | 12/2017 | Aziz |
| 9,838,417 B1 | 12/2017 | Khalid et al. |
| 9,846,776 B1 | 12/2017 | Paithane et al. |
| 9,876,701 B1 | 1/2018 | Caldejon et al. |
| 9,888,016 B1 | 2/2018 | Amin et al. |
| 9,888,019 B1 | 2/2018 | Pidathala et al. |
| 9,910,988 B1 | 3/2018 | Vincent et al. |
| 9,912,644 B2 | 3/2018 | Cunningham |
| 9,912,681 B1 | 3/2018 | Ismael et al. |
| 9,912,684 B1 | 3/2018 | Aziz et al. |
| 9,912,691 B2 | 3/2018 | Mesdaq et al. |
| 9,912,698 B1 | 3/2018 | Thioux et al. |
| 9,916,440 B1 | 3/2018 | Paithane et al. |
| 9,921,978 B1 | 3/2018 | Chan et al. |
| 9,934,376 B1 | 4/2018 | Ismael |
| 9,934,381 B1 | 4/2018 | Kindlund et al. |
| 9,946,568 B1 | 4/2018 | Ismael et al. |
| 9,954,890 B1 | 4/2018 | Staniford et al. |
| 9,973,531 B1 | 5/2018 | Thioux |
| 10,002,252 B2 | 6/2018 | Ismael et al. |
| 10,019,338 B1 | 7/2018 | Goradia et al. |
| 10,019,573 B2 | 7/2018 | Silberman et al. |
| 10,025,691 B1 | 7/2018 | Ismael et al. |
| 10,025,927 B1 | 7/2018 | Khalid et al. |
| 10,027,689 B1 | 7/2018 | Rathor et al. |

(56) References Cited

U.S. PATENT DOCUMENTS

| | | |
|---|---|---|
| 10,027,690 B2 | 7/2018 | Aziz et al. |
| 10,027,696 B1 | 7/2018 | Rivlin et al. |
| 10,033,747 B1 | 7/2018 | Paithane et al. |
| 10,033,748 B1 | 7/2018 | Cunningham et al. |
| 10,033,753 B1 | 7/2018 | Islam et al. |
| 10,033,759 B1 | 7/2018 | Kabra et al. |
| 10,050,998 B1 | 8/2018 | Singh |
| 10,068,091 B1 | 9/2018 | Aziz et al. |
| 10,075,455 B2 | 9/2018 | Zafar et al. |
| 10,083,302 B1 | 9/2018 | Paithane et al. |
| 10,084,813 B2 | 9/2018 | Eyada |
| 10,089,461 B1 | 10/2018 | Ha et al. |
| 10,097,573 B1 | 10/2018 | Aziz |
| 10,104,102 B1 | 10/2018 | Neumann |
| 10,108,446 B1 | 10/2018 | Steinberg et al. |
| 10,121,000 B1 | 11/2018 | Rivlin et al. |
| 10,122,746 B1 | 11/2018 | Manni et al. |
| 10,133,863 B2 | 11/2018 | Bu et al. |
| 10,133,866 B1 | 11/2018 | Kumar et al. |
| 10,146,810 B2 | 12/2018 | Shiffer et al. |
| 10,148,693 B2 | 12/2018 | Singh et al. |
| 10,165,000 B1 | 12/2018 | Aziz et al. |
| 10,169,585 B1 | 1/2019 | Pilipenko et al. |
| 10,176,321 B2 | 1/2019 | Abbasi et al. |
| 10,181,029 B1 | 1/2019 | Ismael et al. |
| 10,191,861 B1 | 1/2019 | Steinberg et al. |
| 10,192,052 B1 | 1/2019 | Singh et al. |
| 10,198,574 B1 | 2/2019 | Thioux et al. |
| 10,200,384 B1 | 2/2019 | Mushtaq et al. |
| 10,210,329 B1 | 2/2019 | Malik et al. |
| 10,216,927 B1 | 2/2019 | Steinberg |
| 10,218,740 B1 | 2/2019 | Mesdaq et al. |
| 10,242,185 B1 | 3/2019 | Goradia |
| 2001/0005889 A1 | 6/2001 | Albrecht |
| 2001/0047326 A1 | 11/2001 | Broadbent et al. |
| 2002/0018903 A1 | 2/2002 | Kokubo et al. |
| 2002/0038430 A1 | 3/2002 | Edwards et al. |
| 2002/0091819 A1 | 7/2002 | Melchione et al. |
| 2002/0095607 A1 | 7/2002 | Lin-Hendel |
| 2002/0116627 A1 | 8/2002 | Tarbotton et al. |
| 2002/0144156 A1 | 10/2002 | Copeland |
| 2002/0162015 A1 | 10/2002 | Tang |
| 2002/0166063 A1 | 11/2002 | Lachman et al. |
| 2002/0169952 A1 | 11/2002 | DiSanto et al. |
| 2002/0184528 A1 | 12/2002 | Shevenell et al. |
| 2002/0188887 A1 | 12/2002 | Largman et al. |
| 2002/0194490 A1 | 12/2002 | Halperin et al. |
| 2003/0021728 A1 | 1/2003 | Sharpe et al. |
| 2003/0074578 A1 | 4/2003 | Ford et al. |
| 2003/0084318 A1 | 5/2003 | Schertz |
| 2003/0101381 A1 | 5/2003 | Mateev et al. |
| 2003/0115483 A1 | 6/2003 | Liang |
| 2003/0188190 A1 | 10/2003 | Aaron et al. |
| 2003/0191957 A1 | 10/2003 | Hypponen et al. |
| 2003/0200460 A1 | 10/2003 | Morota et al. |
| 2003/0212902 A1 | 11/2003 | van der Made |
| 2003/0229801 A1 | 12/2003 | Kouznetsov et al. |
| 2003/0237000 A1 | 12/2003 | Denton et al. |
| 2004/0003323 A1 | 1/2004 | Bennett et al. |
| 2004/0006473 A1 | 1/2004 | Mills et al. |
| 2004/0015712 A1 | 1/2004 | Szor |
| 2004/0019574 A1* | 1/2004 | Meng ............... G06Q 10/10 706/15 |
| 2004/0019832 A1 | 1/2004 | Arnold et al. |
| 2004/0047356 A1 | 3/2004 | Bauer |
| 2004/0083408 A1 | 4/2004 | Spiegel et al. |
| 2004/0088581 A1 | 5/2004 | Brawn et al. |
| 2004/0093513 A1 | 5/2004 | Cantrell et al. |
| 2004/0111531 A1 | 6/2004 | Staniford et al. |
| 2004/0117478 A1 | 6/2004 | Triulzi et al. |
| 2004/0117624 A1 | 6/2004 | Brandt et al. |
| 2004/0128355 A1 | 7/2004 | Chao et al. |
| 2004/0165588 A1 | 8/2004 | Pandya |
| 2004/0236963 A1 | 11/2004 | Danford et al. |
| 2004/0243349 A1 | 12/2004 | Greifeneder et al. |
| 2004/0249911 A1 | 12/2004 | Alkhatib et al. |
| 2004/0255161 A1 | 12/2004 | Cavanaugh |
| 2004/0268147 A1 | 12/2004 | Wiederin et al. |
| 2005/0005159 A1 | 1/2005 | Oliphant |
| 2005/0021740 A1 | 1/2005 | Bar et al. |
| 2005/0033960 A1 | 2/2005 | Vialen et al. |
| 2005/0033989 A1 | 2/2005 | Poletto et al. |
| 2005/0050148 A1 | 3/2005 | Mohammadioun et al. |
| 2005/0086523 A1 | 4/2005 | Zimmer et al. |
| 2005/0091513 A1 | 4/2005 | Mitomo et al. |
| 2005/0091533 A1 | 4/2005 | Omote et al. |
| 2005/0091652 A1 | 4/2005 | Ross et al. |
| 2005/0108562 A1 | 5/2005 | Khazan et al. |
| 2005/0114663 A1 | 5/2005 | Cornell et al. |
| 2005/0125195 A1 | 6/2005 | Brendel |
| 2005/0149726 A1 | 7/2005 | Joshi et al. |
| 2005/0157662 A1 | 7/2005 | Bingham et al. |
| 2005/0183143 A1 | 8/2005 | Anderholm et al. |
| 2005/0201297 A1 | 9/2005 | Peikari |
| 2005/0210533 A1 | 9/2005 | Copeland et al. |
| 2005/0238005 A1 | 10/2005 | Chen et al. |
| 2005/0240781 A1 | 10/2005 | Gassoway |
| 2005/0262562 A1 | 11/2005 | Gassoway |
| 2005/0265331 A1 | 12/2005 | Stolfo |
| 2005/0283839 A1 | 12/2005 | Cowburn |
| 2006/0010495 A1 | 1/2006 | Cohen et al. |
| 2006/0015416 A1 | 1/2006 | Hoffman et al. |
| 2006/0015715 A1 | 1/2006 | Anderson |
| 2006/0015747 A1 | 1/2006 | Van de Ven |
| 2006/0021029 A1 | 1/2006 | Brickell et al. |
| 2006/0021054 A1 | 1/2006 | Costa et al. |
| 2006/0031476 A1 | 2/2006 | Mathes et al. |
| 2006/0047665 A1 | 3/2006 | Neil |
| 2006/0070130 A1 | 3/2006 | Costea et al. |
| 2006/0075496 A1 | 4/2006 | Carpenter et al. |
| 2006/0095968 A1 | 5/2006 | Portolani et al. |
| 2006/0101516 A1 | 5/2006 | Sudaharan et al. |
| 2006/0101517 A1 | 5/2006 | Banzhof et al. |
| 2006/0117385 A1 | 6/2006 | Mester et al. |
| 2006/0123477 A1 | 6/2006 | Raghavan et al. |
| 2006/0143709 A1 | 6/2006 | Brooks et al. |
| 2006/0150249 A1 | 7/2006 | Gassen et al. |
| 2006/0161983 A1 | 7/2006 | Cothrell et al. |
| 2006/0161987 A1 | 7/2006 | Levy-Yurista |
| 2006/0161989 A1 | 7/2006 | Reshef et al. |
| 2006/0164199 A1 | 7/2006 | Glide et al. |
| 2006/0173992 A1 | 8/2006 | Weber et al. |
| 2006/0179147 A1 | 8/2006 | Tran et al. |
| 2006/0184632 A1 | 8/2006 | Marino et al. |
| 2006/0191010 A1 | 8/2006 | Benjamin |
| 2006/0221956 A1 | 10/2006 | Narayan et al. |
| 2006/0236393 A1 | 10/2006 | Kramer et al. |
| 2006/0242709 A1 | 10/2006 | Seinfeld et al. |
| 2006/0248519 A1 | 11/2006 | Jaeger et al. |
| 2006/0248582 A1 | 11/2006 | Panjwani et al. |
| 2006/0251104 A1 | 11/2006 | Koga |
| 2006/0288417 A1 | 12/2006 | Bookbinder et al. |
| 2007/0006288 A1 | 1/2007 | Mayfield et al. |
| 2007/0006313 A1 | 1/2007 | Porras et al. |
| 2007/0011174 A1 | 1/2007 | Takaragi et al. |
| 2007/0016951 A1 | 1/2007 | Piccard et al. |
| 2007/0019286 A1 | 1/2007 | Kikuchi |
| 2007/0033645 A1 | 2/2007 | Jones |
| 2007/0038943 A1 | 2/2007 | FitzGerald et al. |
| 2007/0064689 A1 | 3/2007 | Shin et al. |
| 2007/0074169 A1 | 3/2007 | Chess |
| 2007/0094730 A1 | 4/2007 | Bhikkaji et al. |
| 2007/0101435 A1 | 5/2007 | Konanka et al. |
| 2007/0128855 A1 | 6/2007 | Cho et al. |
| 2007/0142030 A1 | 6/2007 | Sinha et al. |
| 2007/0143827 A1 | 6/2007 | Nicodemus et al. |
| 2007/0156895 A1 | 7/2007 | Vuong |
| 2007/0157180 A1 | 7/2007 | Tillmann et al. |
| 2007/0157306 A1 | 7/2007 | Elrod et al. |
| 2007/0168988 A1 | 7/2007 | Eisner et al. |
| 2007/0171824 A1 | 7/2007 | Ruello et al. |
| 2007/0174915 A1 | 7/2007 | Gribble et al. |
| 2007/0192500 A1 | 8/2007 | Lum |
| 2007/0192858 A1 | 8/2007 | Lum |

(56) References Cited

U.S. PATENT DOCUMENTS

| | | |
|---|---|---|
| 2007/0198275 A1 | 8/2007 | Malden et al. |
| 2007/0208822 A1 | 9/2007 | Wang et al. |
| 2007/0220607 A1 | 9/2007 | Sprosts et al. |
| 2007/0240218 A1 | 10/2007 | Tuvell et al. |
| 2007/0240219 A1 | 10/2007 | Tuvell et al. |
| 2007/0240220 A1 | 10/2007 | Tuvell et al. |
| 2007/0240222 A1 | 10/2007 | Tuvell et al. |
| 2007/0250930 A1 | 10/2007 | Aziz et al. |
| 2007/0256132 A2 | 11/2007 | Oliphant |
| 2007/0271446 A1 | 11/2007 | Nakamura |
| 2008/0005782 A1 | 1/2008 | Aziz |
| 2008/0018122 A1 | 1/2008 | Zierler et al. |
| 2008/0028463 A1 | 1/2008 | Dagon et al. |
| 2008/0040710 A1 | 2/2008 | Chiriac |
| 2008/0046781 A1 | 2/2008 | Childs et al. |
| 2008/0066179 A1 | 3/2008 | Liu |
| 2008/0072326 A1 | 3/2008 | Danford et al. |
| 2008/0077793 A1 | 3/2008 | Tan et al. |
| 2008/0080518 A1 | 4/2008 | Hoeflin et al. |
| 2008/0086720 A1 | 4/2008 | Lekel |
| 2008/0098476 A1 | 4/2008 | Syversen |
| 2008/0120722 A1 | 5/2008 | Sima et al. |
| 2008/0134178 A1 | 6/2008 | Fitzgerald et al. |
| 2008/0134334 A1 | 6/2008 | Kim et al. |
| 2008/0141376 A1 | 6/2008 | Clausen et al. |
| 2008/0184367 A1 | 7/2008 | McMillan et al. |
| 2008/0184373 A1 | 7/2008 | Traut et al. |
| 2008/0189787 A1 | 8/2008 | Arnold et al. |
| 2008/0201778 A1 | 8/2008 | Guo et al. |
| 2008/0209557 A1 | 8/2008 | Herley et al. |
| 2008/0215742 A1 | 9/2008 | Goldszmidt et al. |
| 2008/0222729 A1 | 9/2008 | Chen et al. |
| 2008/0263665 A1 | 10/2008 | Ma et al. |
| 2008/0295172 A1 | 11/2008 | Bohacek |
| 2008/0301810 A1 | 12/2008 | Lehane et al. |
| 2008/0307524 A1 | 12/2008 | Singh et al. |
| 2008/0313738 A1 | 12/2008 | Enderby |
| 2008/0320594 A1 | 12/2008 | Jiang |
| 2009/0003317 A1 | 1/2009 | Kasralikar et al. |
| 2009/0007100 A1 | 1/2009 | Field et al. |
| 2009/0013408 A1 | 1/2009 | Schipka |
| 2009/0031423 A1 | 1/2009 | Liu et al. |
| 2009/0036111 A1 | 2/2009 | Danford et al. |
| 2009/0037835 A1 | 2/2009 | Goldman |
| 2009/0044024 A1 | 2/2009 | Oberheide et al. |
| 2009/0044274 A1* | 2/2009 | Budko ............... G06F 21/53 726/24 |
| 2009/0064332 A1 | 3/2009 | Porras et al. |
| 2009/0077666 A1 | 3/2009 | Chen et al. |
| 2009/0083369 A1 | 3/2009 | Marmor |
| 2009/0083855 A1 | 3/2009 | Apap et al. |
| 2009/0089879 A1 | 4/2009 | Wang et al. |
| 2009/0094697 A1 | 4/2009 | Provos et al. |
| 2009/0113425 A1 | 4/2009 | Ports et al. |
| 2009/0125976 A1 | 5/2009 | Wassermann et al. |
| 2009/0126015 A1 | 5/2009 | Monastyrsky et al. |
| 2009/0126016 A1 | 5/2009 | Sobko et al. |
| 2009/0133125 A1 | 5/2009 | Choi et al. |
| 2009/0144823 A1 | 6/2009 | Lamastra et al. |
| 2009/0158430 A1 | 6/2009 | Borders |
| 2009/0172815 A1 | 7/2009 | Gu et al. |
| 2009/0187992 A1 | 7/2009 | Poston |
| 2009/0193293 A1 | 7/2009 | Stolfo et al. |
| 2009/0198651 A1 | 8/2009 | Shiffer et al. |
| 2009/0198670 A1 | 8/2009 | Shiffer et al. |
| 2009/0198689 A1 | 8/2009 | Frazier et al. |
| 2009/0199274 A1 | 8/2009 | Frazier et al. |
| 2009/0199296 A1 | 8/2009 | Xie et al. |
| 2009/0228233 A1 | 9/2009 | Anderson et al. |
| 2009/0241187 A1 | 9/2009 | Troyansky |
| 2009/0241190 A1 | 9/2009 | Todd et al. |
| 2009/0265692 A1 | 10/2009 | Godefroid et al. |
| 2009/0271867 A1 | 10/2009 | Zhang |
| 2009/0300415 A1 | 12/2009 | Zhang et al. |
| 2009/0300761 A1 | 12/2009 | Park et al. |
| 2009/0328185 A1 | 12/2009 | Berg et al. |
| 2009/0328221 A1 | 12/2009 | Blumfield et al. |
| 2010/0005146 A1 | 1/2010 | Drako et al. |
| 2010/0011205 A1 | 1/2010 | McKenna |
| 2010/0017546 A1 | 1/2010 | Poo et al. |
| 2010/0030996 A1 | 2/2010 | Butler, II |
| 2010/0031353 A1 | 2/2010 | Thomas et al. |
| 2010/0037314 A1 | 2/2010 | Perdisci et al. |
| 2010/0043073 A1 | 2/2010 | Kuwamura |
| 2010/0054278 A1 | 3/2010 | Stolfo et al. |
| 2010/0058474 A1 | 3/2010 | Hicks |
| 2010/0064044 A1 | 3/2010 | Nonoyama |
| 2010/0077481 A1 | 3/2010 | Polyakov et al. |
| 2010/0083376 A1 | 4/2010 | Pereira et al. |
| 2010/0115621 A1 | 5/2010 | Staniford et al. |
| 2010/0132038 A1 | 5/2010 | Zaitsev |
| 2010/0154056 A1 | 6/2010 | Smith et al. |
| 2010/0180344 A1 | 7/2010 | Malyshev et al. |
| 2010/0192223 A1 | 7/2010 | Ismael et al. |
| 2010/0220863 A1 | 9/2010 | Dupaquis et al. |
| 2010/0235831 A1 | 9/2010 | Dittmer |
| 2010/0251104 A1 | 9/2010 | Massand |
| 2010/0281102 A1 | 11/2010 | Chinta et al. |
| 2010/0281541 A1 | 11/2010 | Stolfo et al. |
| 2010/0281542 A1 | 11/2010 | Stolfo et al. |
| 2010/0287260 A1 | 11/2010 | Peterson et al. |
| 2010/0299754 A1 | 11/2010 | Amit et al. |
| 2010/0306173 A1 | 12/2010 | Frank |
| 2011/0004737 A1 | 1/2011 | Greenebaum |
| 2011/0025504 A1 | 2/2011 | Lyon et al. |
| 2011/0041179 A1 | 2/2011 | St Hlberg |
| 2011/0047594 A1 | 2/2011 | Mahaffey et al. |
| 2011/0047620 A1 | 2/2011 | Mahaffey et al. |
| 2011/0055907 A1 | 3/2011 | Narasimhan et al. |
| 2011/0078794 A1 | 3/2011 | Manni et al. |
| 2011/0093951 A1 | 4/2011 | Aziz |
| 2011/0099620 A1 | 4/2011 | Stavrou et al. |
| 2011/0099633 A1 | 4/2011 | Aziz |
| 2011/0099635 A1 | 4/2011 | Silberman et al. |
| 2011/0113231 A1 | 5/2011 | Kaminsky |
| 2011/0145918 A1 | 6/2011 | Jung et al. |
| 2011/0145920 A1 | 6/2011 | Mahaffey et al. |
| 2011/0145934 A1 | 6/2011 | Abramovici et al. |
| 2011/0167493 A1 | 7/2011 | Song et al. |
| 2011/0167494 A1 | 7/2011 | Bowen et al. |
| 2011/0173213 A1 | 7/2011 | Frazier et al. |
| 2011/0173460 A1 | 7/2011 | Ito et al. |
| 2011/0219449 A1 | 9/2011 | St. Neitzel et al. |
| 2011/0219450 A1 | 9/2011 | McDougal et al. |
| 2011/0225624 A1 | 9/2011 | Sawhney et al. |
| 2011/0225655 A1 | 9/2011 | Niemela et al. |
| 2011/0247072 A1 | 10/2011 | Staniford et al. |
| 2011/0265182 A1 | 10/2011 | Peinado et al. |
| 2011/0271343 A1* | 11/2011 | Kim ............... G06F 21/566 726/23 |
| 2011/0289582 A1 | 11/2011 | Kejriwal et al. |
| 2011/0302587 A1 | 12/2011 | Nishikawa et al. |
| 2011/0307954 A1 | 12/2011 | Melnik et al. |
| 2011/0307955 A1 | 12/2011 | Kaplan et al. |
| 2011/0307956 A1 | 12/2011 | Yermakov et al. |
| 2011/0314546 A1 | 12/2011 | Aziz et al. |
| 2012/0023593 A1 | 1/2012 | Puder et al. |
| 2012/0054869 A1 | 3/2012 | Yen et al. |
| 2012/0066698 A1 | 3/2012 | Yanoo |
| 2012/0079596 A1 | 3/2012 | Thomas et al. |
| 2012/0084859 A1 | 4/2012 | Radinsky et al. |
| 2012/0096553 A1 | 4/2012 | Srivastava et al. |
| 2012/0110667 A1 | 5/2012 | Zubrilin et al. |
| 2012/0117652 A1 | 5/2012 | Manni et al. |
| 2012/0121154 A1 | 5/2012 | Xue et al. |
| 2012/0124426 A1 | 5/2012 | Maybee et al. |
| 2012/0174186 A1 | 7/2012 | Aziz et al. |
| 2012/0174196 A1 | 7/2012 | Bhogavilli et al. |
| 2012/0174218 A1 | 7/2012 | McCoy et al. |
| 2012/0198279 A1 | 8/2012 | Schroeder |
| 2012/0210423 A1* | 8/2012 | Friedrichs ........... H04L 63/1416 726/22 |
| 2012/0216280 A1* | 8/2012 | Zorn ............... G06N 7/005 726/23 |

(56) References Cited

U.S. PATENT DOCUMENTS

| | | |
|---|---|---|
| 2012/0222121 A1 | 8/2012 | Staniford et al. |
| 2012/0255015 A1 | 10/2012 | Sahita et al. |
| 2012/0255017 A1 | 10/2012 | Sallam |
| 2012/0260342 A1 | 10/2012 | Dube et al. |
| 2012/0266244 A1 | 10/2012 | Green et al. |
| 2012/0278886 A1 | 11/2012 | Luna |
| 2012/0297489 A1 | 11/2012 | Dequevy |
| 2012/0330801 A1 | 12/2012 | McDougal et al. |
| 2012/0331553 A1 | 12/2012 | Aziz et al. |
| 2013/0014259 A1 | 1/2013 | Gribble et al. |
| 2013/0036472 A1 | 2/2013 | Aziz |
| 2013/0047257 A1 | 2/2013 | Aziz |
| 2013/0074185 A1 | 3/2013 | McDougal et al. |
| 2013/0086684 A1 | 4/2013 | Mohler |
| 2013/0097699 A1 | 4/2013 | Balupari et al. |
| 2013/0097706 A1 | 4/2013 | Titonis et al. |
| 2013/0111587 A1 | 5/2013 | Goel et al. |
| 2013/0117852 A1 | 5/2013 | Stute |
| 2013/0117855 A1 | 5/2013 | Kim et al. |
| 2013/0139264 A1 | 5/2013 | Brinkley et al. |
| 2013/0160125 A1 | 6/2013 | Likhachev et al. |
| 2013/0160127 A1 | 6/2013 | Jeong et al. |
| 2013/0160130 A1 | 6/2013 | Mendelev et al. |
| 2013/0160131 A1 | 6/2013 | Madou et al. |
| 2013/0167236 A1 | 6/2013 | Sick |
| 2013/0174214 A1 | 7/2013 | Duncan |
| 2013/0185789 A1 | 7/2013 | Hagiwara et al. |
| 2013/0185795 A1 | 7/2013 | Winn et al. |
| 2013/0185798 A1 | 7/2013 | Saunders et al. |
| 2013/0191915 A1 | 7/2013 | Antonakakis et al. |
| 2013/0196649 A1 | 8/2013 | Paddon et al. |
| 2013/0227691 A1 | 8/2013 | Aziz et al. |
| 2013/0246370 A1 | 9/2013 | Bartram et al. |
| 2013/0247186 A1 | 9/2013 | LeMasters |
| 2013/0263260 A1 | 10/2013 | Mahaffey et al. |
| 2013/0291109 A1 | 10/2013 | Staniford et al. |
| 2013/0298243 A1 | 11/2013 | Kumar et al. |
| 2013/0318038 A1 | 11/2013 | Shiffer et al. |
| 2013/0318073 A1 | 11/2013 | Shiffer et al. |
| 2013/0325791 A1 | 12/2013 | Shiffer et al. |
| 2013/0325792 A1 | 12/2013 | Shiffer et al. |
| 2013/0325871 A1 | 12/2013 | Shiffer et al. |
| 2013/0325872 A1 | 12/2013 | Shiffer et al. |
| 2014/0032875 A1 | 1/2014 | Butler |
| 2014/0053260 A1 | 2/2014 | Gupta et al. |
| 2014/0053261 A1 | 2/2014 | Gupta et al. |
| 2014/0130158 A1 | 5/2014 | Wang et al. |
| 2014/0137180 A1 | 5/2014 | Lukacs et al. |
| 2014/0169762 A1 | 6/2014 | Ryu |
| 2014/0179360 A1 | 6/2014 | Jackson et al. |
| 2014/0181131 A1 | 6/2014 | Ross |
| 2014/0189687 A1 | 7/2014 | Jung et al. |
| 2014/0189866 A1 | 7/2014 | Shiffer et al. |
| 2014/0189882 A1 | 7/2014 | Jung et al. |
| 2014/0237600 A1 | 8/2014 | Silberman et al. |
| 2014/0280245 A1 | 9/2014 | Wilson |
| 2014/0283037 A1 | 9/2014 | Sikorski et al. |
| 2014/0283063 A1 | 9/2014 | Thompson et al. |
| 2014/0328204 A1 | 11/2014 | Klotsche et al. |
| 2014/0337836 A1 | 11/2014 | Ismael |
| 2014/0344926 A1 | 11/2014 | Cunningham et al. |
| 2014/0351935 A1 | 11/2014 | Shao et al. |
| 2014/0380473 A1 | 12/2014 | Bu et al. |
| 2014/0380474 A1 | 12/2014 | Paithane et al. |
| 2015/0007312 A1 | 1/2015 | Pidathala et al. |
| 2015/0096022 A1 | 4/2015 | Vincent et al. |
| 2015/0096023 A1 | 4/2015 | Mesdaq et al. |
| 2015/0096024 A1 | 4/2015 | Haq et al. |
| 2015/0096025 A1 | 4/2015 | Ismael |
| 2015/0180886 A1 | 6/2015 | Staniford et al. |
| 2015/0186645 A1 | 7/2015 | Aziz et al. |
| 2015/0199513 A1 | 7/2015 | Ismael et al. |
| 2015/0199531 A1 | 7/2015 | Ismael et al. |
| 2015/0199532 A1 | 7/2015 | Ismael et al. |
| 2015/0220735 A1 | 8/2015 | Paithane et al. |
| 2015/0372980 A1 | 12/2015 | Eyada |
| 2016/0004869 A1 | 1/2016 | Ismael et al. |
| 2016/0006756 A1 | 1/2016 | Ismael et al. |
| 2016/0021141 A1* | 1/2016 | Liu ............... H04L 63/1433 726/23 |
| 2016/0044000 A1 | 2/2016 | Cunningham |
| 2016/0127393 A1 | 5/2016 | Aziz et al. |
| 2016/0191547 A1 | 6/2016 | Zafar et al. |
| 2016/0191550 A1 | 6/2016 | Ismael et al. |
| 2016/0261612 A1 | 9/2016 | Mesdaq et al. |
| 2016/0285914 A1 | 9/2016 | Singh et al. |
| 2016/0301703 A1 | 10/2016 | Aziz |
| 2016/0335110 A1 | 11/2016 | Paithane et al. |
| 2017/0083703 A1 | 3/2017 | Abbasi et al. |
| 2018/0013770 A1 | 1/2018 | Ismael |
| 2018/0034835 A1* | 2/2018 | Iwanir ............ H04L 63/1425 |
| 2018/0048660 A1 | 2/2018 | Paithane et al. |
| 2018/0077175 A1* | 3/2018 | DiValentin .......... G06F 16/254 |
| 2018/0121316 A1 | 5/2018 | Ismael et al. |
| 2018/0239902 A1* | 8/2018 | Godard ............ G06F 21/552 |
| 2018/0288077 A1 | 10/2018 | Siddiqui et al. |
| 2019/0387005 A1* | 12/2019 | Zawoad .......... H04L 63/1425 |

FOREIGN PATENT DOCUMENTS

| | | |
|---|---|---|
| WO | 0206928 A2 | 1/2002 |
| WO | 02/23805 A2 | 3/2002 |
| WO | 2007117636 A2 | 10/2007 |
| WO | 2008/041950 A2 | 4/2008 |
| WO | 2011/084431 A2 | 7/2011 |
| WO | 2011/112348 A1 | 9/2011 |
| WO | 2012/075336 A1 | 6/2012 |
| WO | 2012/145066 A1 | 10/2012 |
| WO | 2013/067505 A1 | 5/2013 |

OTHER PUBLICATIONS

Vladimir Getov: "Security as a Service in Smart Clouds—Opportunities and Concerns", Computer Software and Applications Conference (COMPSAC), 2012 IEEE 36th Annual, IEEE, Jul. 16, 2012 (Jul. 16, 2012).

Wahid et al., Characterising the Evolution in Scanning Activity of Suspicious Hosts, Oct. 2009, Third International Conference on Network and System Security, pp. 344-350.

Whyte, et al., "DNS-Based Detection of Scanning Works in an Enterprise Network", Proceedings of the 12th Annual Network and Distributed System Security Symposium, (Feb. 2005), 15 pages.

Williamson, Matthew M., "Throttling Viruses: Restricting Propagation to Defeat Malicious Mobile Code", ACSAC Conference, Las Vegas, NV, USA, (Dec. 2002), pp. 1-9.

Yuhei Kawakoya et al: "Memory behavior-based automatic malware unpacking in stealth debugging environment", Malicious and Unwanted Software (Malware), 2010 5th International Conference on, IEEE, Piscataway, NJ, USA, Oct. 19, 2010, pp. 39-46, XP031833827, ISBN:978-1-4244-8-9353-1.

Zhang et al., The Effects of Threading, Infection Time, and Multiple-Attacker Collaboration on Malware Propagation, Sep. 2009, IEEE 28th International Symposium on Reliable Distributed Systems, pp. 73-82.

"Mining Specification of Malicious Behavior"—Jha et al, UCSB, Sep. 2007 https://www.cs.ucsb.edu/.about.chris/research/doc/esec07.sub.--mining.pdf-.

"Network Security: NetDetector—Network Intrusion Forensic System (NIFS) Whitepaper", ("NetDetector Whitepaper"), (2003).

"When Virtual is Better Than Real", IEEEXplore Digital Library, available at, http://ieeexplore.ieee.org/xpl/articleDetails.jsp?reload=true&arnumbe- r=990073, (Dec. 7, 2013).

Abdullah, et al., Visualizing Network Data for Intrusion Detection, 2005 IEEE Workshop on Information Assurance and Security, pp. 100-108.

Adetoye, Adedayo, et al., "Network Intrusion Detection & Response System", ("Adetoye"), (Sep. 2003).

Apostolopoulos, George; hassapis, Constantinos; "V-eM: A cluster of Virtual Machines for Robust, Detailed, and High-Performance

(56) References Cited

OTHER PUBLICATIONS

Network Emulation", 14th IEEE International Symposium on Modeling, Analysis, and Simulation of Computer and Telecommunication Systems, Sep. 11-14, 2006, pp. 117-126.
Aura, Tuomas, "Scanning electronic documents for personally identifiable information", Proceedings of the 5th ACM workshop on Privacy in electronic society. ACM, 2006.
Baecher, "The Nepenthes Platform: An Efficient Approach to collect Malware", Springer-verlag Berlin Heidelberg, (2006), pp. 165-184.
Bayer, et al., "Dynamic Analysis of Malicious Code", J Comput Virol, Springer-Verlag, France., (2006), pp. 67-77.
Boubalos, Chris , "Extracting syslog data out of raw pcap dumps, seclists.org, Honeypots mailing list archives", available at http://seclists.org/honeypots/2003/q2/319 ("Boubalos"), (Jun. 5, 2003).
Chaudet, C. , et al., "Optimal Positioning of Active and Passive Monitoring Devices", International Conference on Emerging Networking Experiments and Technologies, Proceedings of the 2005 ACM Conference on Emerging Network Experiment and Technology, CoNEXT '05, Toulousse, France, (Oct. 2005), pp. 71-82.
Chen, P. M. and Noble, B. D., "When Virtual is Better Than Real, Department of Electrical Engineering and Computer Science", University of Michigan ("Chen") (2001).
Cisco "Intrusion Prevention for the Cisco ASA 5500-x Series" Data Sheet (2012).
Cohen, M.I. , "PyFlag—An advanced network forensic framework", Digital investigation 5, Elsevier, (2008), pp. S112-S120.
Costa, M. , et al., "Vigilante: End-to-End Containment of Internet Worms", SOSP '05, Association for Computing Machinery, Inc., Brighton U.K., (Oct. 23-26, 2005).
Didier Stevens, "Malicious PDF Documents Explained", Security & Privacy, IEEE, IEEE Service Center, Los Alamitos, CA, US, vol. 9, No. 1, Jan. 1, 2011, pp. 80-82, XP011329453, ISSN: 1540-7993, DOI: 10.1109/MSP.2011.14.
Distler, "Malware Analysis: An Introduction", SANS Institute InfoSec Reading Room, SANS Institute, (2007).
Dunlap, George W. , et al., "ReVirt: Enabling Intrusion Analysis through Virtual-Machine Logging and Replay", Proceeding of the 5th Symposium on Operating Systems Design and Implementation, USENIX Association, ("Dunlap"), (Dec. 9, 2002).
FireEye Malware Analysis & Exchange Network, Malware Protection System, FireEye Inc., 2010.
FireEye Malware Analysis, Modern Malware Forensics, FireEye Inc., 2010.
FireEye v.6.0 Security Target, pp. 1-35, Version 1.1, FireEye Inc., May 2011.
Goel, et al., Reconstructing System State for Intrusion Analysis, Apr. 2008 SIGOPS Operating Systems Review, vol. 42 Issue 3, pp. 21-28.
Gregg Keizer: "Microsoft's HoneyMonkeys Show Patching Windows Works", Aug. 8, 2005, XP055143386, Retrieved from the Internet: URL:http://www.informationweek.com/microsofts-honeymonkeys-show-patching-windows-works/d/d-id/1035069? [retrieved on Jun. 1, 2016].
Heng Yin et al, Panorama: Capturing System-Wide Information Flow for Malware Detection and Analysis, Research Showcase @ CMU, Carnegie Mellon University, 2007.
Hiroshi Shinotsuka, Malware Authors Using New Techniques to Evade Automated Threat Analysis Systems, Oct. 26, 2012, http://www.symantec.com/connect/blogs/, pp. 1-4.
Idika et al., A-Survey-of-Malware-Detection-Techniques, Feb. 2, 2007, Department of Computer Science, Purdue University.
Isohara, Takamasa, Keisuke Takemori, and Ayumu Kubota. "Kernel-based behavior analysis for android malware detection." Computational intelligence and Security (CIS), 2011 Seventh International Conference on. IEEE, 2011.
Kaeo, Merike , "Designing Network Security", ("Kaeo"), (Nov. 2003).
Kevin A Roundy et al: "Hybrid Analysis and Control of Malware", Sep. 15, 2010, Recent Advances in Intrusion Detection, Springer Berlin Heidelberg, Berlin, Heidelberg, pp. 317-338, XP019150454 ISBN:978-3-642-15511-6.
Khaled Salah et al: "Using Cloud Computing to Implement a Security Overlay Network", Security & Privacy, IEEE, IEEE Service Center, Los Alamitos, CA, US, vol. 11, No. 1, Jan. 1, 2013 (Jan. 1, 2013).
Kim, H. , et al., "Autograph: Toward Automated, Distributed Worm Signature Detection", Proceedings of the 13th Usenix Security Symposium (Security 2004), San Diego, (Aug. 2004), pp. 271-286.
King, Samuel T., et al., "Operating System Support for Virtual Machines", ("King"), (2003).
Kreibich, C. , et al., "Honeycomb-Creating Intrusion Detection Signatures Using Honeypots", 2nd Workshop on Hot Topics in Networks (HotNets-11), Boston, USA, (2003).
Kristoff, J. , "Botnets, Detection and Mitigation: DNS-Based Techniques", NU Security Day, (2005), 23 pages.
Lastline Labs, The Threat of Evasive Malware, Feb. 25, 2013, Lastline Labs, pp. 1-8.
Li et al., A VMM-Based System Call Interposition Framework for Program Monitoring, Dec. 2010, IEEE 16th International Conference on Parallel and Distributed Systems, pp. 706-711.
Lindorfer, Martina, Clemens Kolbitsch, and Paolo Milani Comparetti. "Detecting environment-sensitive malware." Recent Advances in Intrusion Detection. Springer Berlin Heidelberg, 2011.
Marchette, David J., "Computer Intrusion Detection and Network Monitoring: A Statistical Viewpoint", ("Marchette"), (2001).
Moore, D. , et al., "Internet Quarantine: Requirements for Containing Self-Propagating Code", INFOCOM, vol. 3, (Mar. 30-Apr. 3, 2003), pp. 1901-1910.
Morales, Jose A., et al., ""Analyzing and exploiting network behaviors of malware."", Security and Privacy in Communication Networks. Springer Berlin Heidelberg, 2010. 20-34.
Mori, Detecting Unknown Computer Viruses, 2004, Springer-Verlag Berlin Heidelberg.
Natvig, Kurt , "SANDBOXII: Internet", Virus Bulletin Conference, ("Natvig"), (Sep. 2002).
NetBIOS Working Group. Protocol Standard for a NetBIOS Service on a TCP/UDP transport: Concepts and Methods. STD 19, RFC 1001, Mar. 1987.
Newsome, J. , et al., "Dynamic Taint Analysis for Automatic Detection, Analysis, and Signature Generation of Exploits on Commodity Software", In Proceedings of the 12th Annual Network and Distributed System Security, Symposium (NDSS '05), (Feb. 2005).
Nojiri, D. , et al., "Cooperation Response Strategies for Large Scale Attack Mitigation", DARPA Information Survivability Conference and Exposition, vol. 1, (Apr. 22-24, 2003), pp. 293-302.
Oberheide et al., CloudAV.sub.--N-Version Antivirus in the Network Cloud, 17th USENIX Security Symposium USENIX Security '08 Jul. 28-Aug. 1, 2008 San Jose, CA.
Reiner Sailer, Enriquillo Valdez, Trent Jaeger, Roonald Perez, Leendert van Doorn, John Linwood Griffin, Stefan Berger., sHype: Secure Hypervisor Appraoch to Trusted Virtualized Systems (Feb. 2, 2005) ("Sailer").
Silicon Defense, "Worm Containment in the Internal Network", (Mar. 2003), pp. 1-25.
Singh, S. , et al., "Automated Worm Fingerprinting", Proceedings of the ACM/USENIX Symposium on Operating System Design and Implementation, San Francisco, California, (Dec. 2004).
Thomas H. Ptacek, and Timothy N. Newsham , "Insertion, Evasion, and Denial of Service: Eluding Network Intrusion Detection", Secure Networks, ("Ptacek"), (Jan. 1998).

\* cited by examiner

RANSOMWARE FILE MODIFICATION PREVENTION TECHNIQUE

CROSS-REFERENCE TO RELATED APPLICATIONS

This application claims the benefit of priority on U.S. Provisional Application No. 62/527,964 filed Jun. 30, 2017, the entire contents of which are incorporated by reference.

FIELD

Embodiments of the disclosure related to the field of cybersecurity. More specifically, embodiments of the disclosure relate to a system for detecting and preventing ransomware attacks before files are affected.

BACKGROUND

Ransomware is a fast-growing threat and is often distributed through the Internet. Ransomware is a type of malicious software (malware) that locks a user out of their device, applications, and/or data. Ransomware may operate by encrypting or otherwise making inaccessible files on an endpoint computer and, typically, alerting a user of the endpoint to the fact that they will not be able to access their files until a ransom is collected. Often ransomware will operate as a background process without any user interaction. Ransomware may target specific filetypes and/or content of high value to elicit payment from the affected user. Some ransomware may irreversibly render files inaccessible, despite ransom payment, making data irretrievable.

For example, ransomware may be downloaded and/or installed on a computer by "drive-by" download (silently installed in the background without user interaction while downloading webpages). Once installed on the endpoint, the user may have no further interaction with the ransomware until the contents of the computer are encrypted as part of the cyber-attack. At least once important data on the endpoint is encrypted, the endpoint user may be alerted by the ransomware to the potential for loss unless a ransom is paid.

Current solutions for ransomware prevention rely on detecting ransomware manipulating "honey files" and preventing that modification. Unfortunately, in the process ransomware is typically able to encrypt at least few of the legitimate files on the system. Moreover, these solutions are highly resource intensive and may fail to detect ransomware designed to ignore honey files. An improved ransomware detection system is needed to reliably protect endpoints from ransomware cyber-security attacks.

BRIEF DESCRIPTION OF THE DRAWINGS

Embodiments of this disclosure are illustrated by way of example and not by way of limitation in the figures of the accompanying drawings, in which like references indicate similar elements and in which.

DETAILED DESCRIPTION

Figure 1:
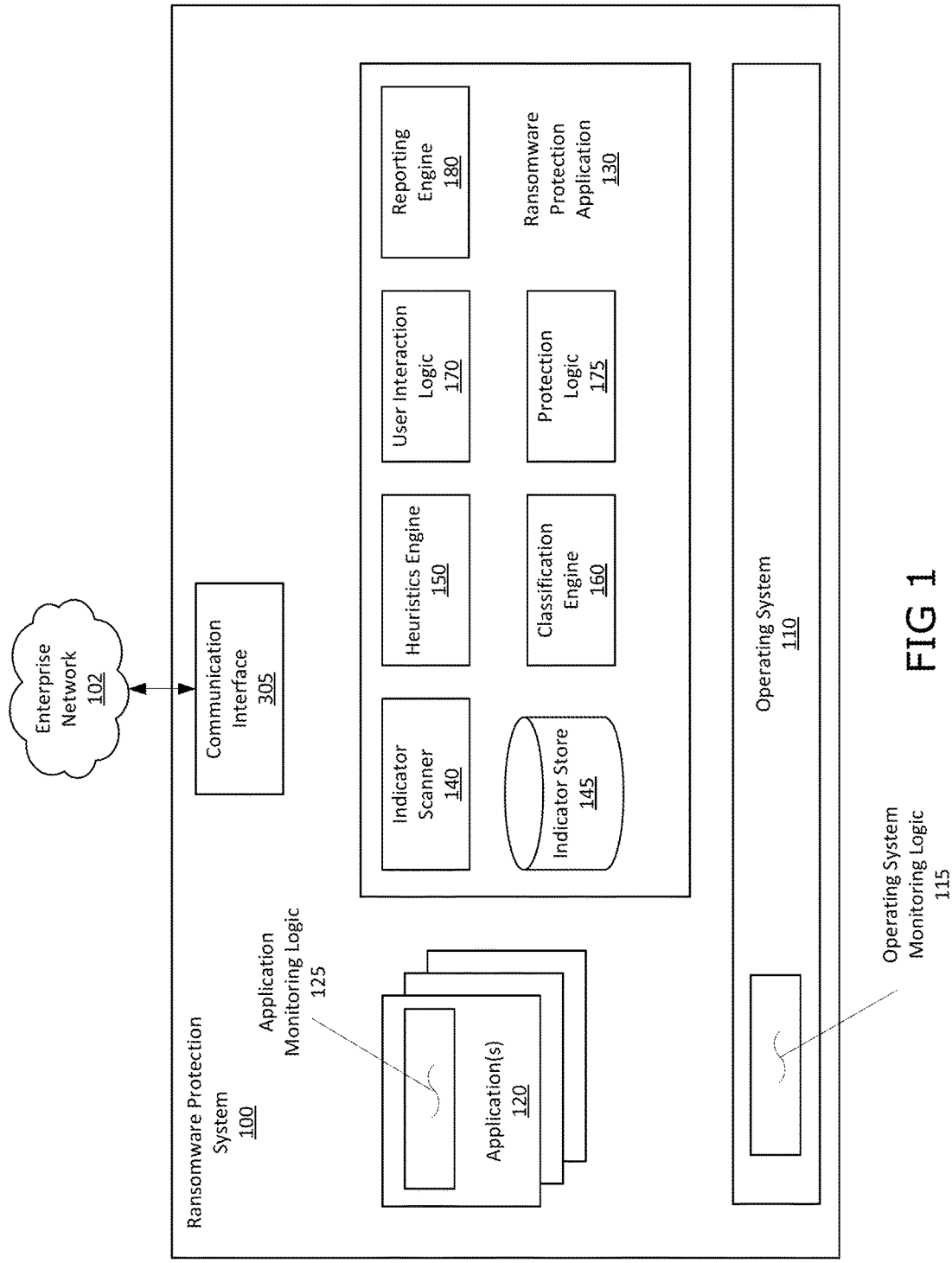
FIG. 1 is an exemplary block diagram of an architecture comprising a ransomware protection system (RPS) according to an embodiment of the invention.

A ransomware prevention technique, limiting the effectiveness of cyber-attacks which encrypt or otherwise render inaccessible files, is provided. The ransomware prevention technique is implemented by a prevention system which (i) identifies a file access attempt (e.g., modify, delete, and/or move) by a process on a protected endpoint, (ii) intercepts the attempted file access by the process, (iii) determines if the attempted file access is permissible, and (iv) if permissible, allows the process to access the file while, if the access is impermissible, prevents access unless otherwise approved by the endpoint user.

More specifically, the ransomware prevention technique embodied in a ransomware prevention system monitors a protected endpoint system for attempted file accesses to one or more files during the execution of a process. One or more requested file accesses by an object or a computer program processing an object (referred to as a "file access events"), during runtime triggers the operation of the ransomware prevention system. An attempted file access request may be directed to any of a variety of files and file locations. These may include (a) any or all the files residing on (or accessible from) the protected endpoint system, (b) a specific type of file located on (or accessible from) the protected endpoint system (e.g., non-system files, excel files, etc.), and/or (c) files designated by the user or administrator of the protected endpoint, e.g., via a user interface. A monitoring logic is provided by the ransomware protection system to detect requests for file access (i.e. file access events). The ransomware prevention system (RPS) may operate by adapting or otherwise provisioning an application (e.g., Microsoft Word, etc.), with monitoring logic, and/or adapting or otherwise provisioning the operating system of the protected endpoint system to generate an analyzable attempted file access event (also referred to as a "file access event") when triggered by a process during execution. In some embodiments, a processor-executable computer program (i.e. agent) may monitor one or more processes executing on the protected system and generate analyzable events when requests for file access are attempted by the process. A file access event may be generated in response to, but not limited to, an attempted file access, file modification, file move, and/or file delete of a protected file. In some embodiments, an attempted file access may further include attempted file accesses to create an incremental backup and/or "snapshot". When the monitoring logic generates an analyzable event, the analyzable event is provided to a ransomware protection application for analysis.

When the ransomware prevention application (RPA) of the RPS generates an attempted file access event (i.e. an "analyzable event"), the RPA may generate an indicator to determine if the analyzable event is associated with known malicious (or benign) event indicators (i.e. a "known event indicator"). A known event indicator may be associated with at least a "block" (i.e. a blacklist) or "allow" (i.e. a whitelist) determination, the associated determination provided to a protection logic. The known event indicator and the respective determinations may be stored in an indicator store of the RPA. If the analyzable event is not associated with a known event indicator, the RPA may provide the analyzable event to a heuristics engine for further analysis.

The heuristics engine analyzes received characteristics and behaviors (collectively, "features") associated with the analyzable event for suspiciousness. Features associated with the analyzable event may include, for example, the characteristics of the attempted file access event (e.g., filename and/or path of the file, the ID of the process requesting file access, etc.) as well as behaviors associated with the attempted file access event (e.g. file access request generated in response to a Graphical User Interface, "GUI", interaction, processes requesting access to a several types of files, etc.) and behaviors related to the genealogy of the process requesting file access. The heuristics engine may examine the features associated with the analyzable event. The heuristics engine may also analyze objects associated with the received file access event, if available. If the analyzable event is determined to be suspicious by the heuristics engine, the engine may issue an alert to the user of the protected system and/or the security administrator of the system to take affirmative action to permit the process to proceed (or not) or, in some embodiments, provide an object associated with the analyzable event to a malware analysis system for further processing to determine if the object is malicious and its processing by the endpoint not permissible. In some embodiments, individual analyzable events may be analyzed for suspiciousness based on the features associated with the event while in alternative embodiments a plurality of analyzable events may be combined and the aggregated features of the combined analyzable events classified as suspicious by the classification engine.

The classification engine may receive from the heuristics engine the features detected and generate a classification of the analyzable event as being associated with "ransomware", "suspicious", or "benign". The classification engine may generate the classification in response to determining a correlation of the features with known features of ransomware. The correlation of the features may be represented as a score, which when exceeding a first threshold may cause the event to be classified as being associated with ransomware based on machine learning and experiential knowledge. In some embodiments if the score does not exceed a second threshold, the analyzable event may be determined to be benign. The first and/or second threshold may be static (e.g., "factory-set") or modifiable (i.e. in response to settings, endpoint user, etc.). In some embodiments the first and/or second threshold may be modifiable in response to an endpoint user role. If the classification engine determines that the analyzable event is associated with ransomware, the protection logic may be instructed to prevent further operations associated with the analyzable event (i.e. continued execution of the process associated with the analyzable event) while the reporting engine is instructed to report to a security administrator the ransomware event. When an analyzable event is determined to be associated with ransomware, the indicators associated with that analyzable event are stored in an indicator store of the RPA as known indicators associated with malware and/or ransomware. If the classification engine cannot determine the analyzable event is associated with ransomware or is benign (i.e. the ransomware score does not exceed the first threshold or second threshold), the analyzable event may be classified as "suspicious".

In response to determining the analyzable event is suspicious the RPA may, in some embodiments, associate the analyzable event with a permissible operation and allow the operation to proceed; otherwise if the operation is not permissible, the operation may be prevented and an alert for the user and security administrator are generated and issued. In some embodiments, the RPA may enable the user to permit the operation for a suspicious analyzable event not previously known to be permissible via a user interaction with a user interface. If a suspicious analyzable event is deemed by the user to be permissible, its operation will be allowed and indicators associated with the analyzable event will be stored in the known indicator store and associated with benign (if the analyzable event is impermissible the indicator for the analyzable event will be associated with malware and/or ransomware in the known indicator store) events. The known indicator store may be based on characteristics of the protected file (e.g. file type). In some embodiments, in response to a suspiciousness determination of the analyzable event, the RPA may alert the user to determine whether the process generating the analyzable event is allowed to continue. If an attempted file access event is not determined to be permissible, the process initiating the analyzable event cannot receive the requested access to the file and the process will not continue execution (execution will be ended by the protection logic of the RPS).

The ransomware prevention technique described herein prevents ransomware cyberattacks by preventing their file operations. By analyzing features associated with attempted file accesses the system is able to identify suspicious operations and prevent ransomware from effecting operation on the protected system.

Terminology

In the following description, certain terminology is used to describe features of the invention. For example, in certain situations, the term "logic" may be representative of hardware, firmware and/or software that is configured to perform one or more functions. As hardware, logic may include circuitry having data processing or storage functionality. Examples of such circuitry may include, but are not limited or restricted to a microprocessor, one or more processor cores, a programmable gate array, a microcontroller, a controller, an application specific integrated circuit, wireless receiver, transmitter and/or transceiver circuitry, semiconductor memory, or combinatorial logic.

The term "process" may include an instance of a computer program (e.g., a collection of instructions, also referred to herein as an application). In one embodiment, the process may be included of one or more threads executing concurrently (e.g., each thread may be executing the same or a different instruction concurrently).

The term "processing" may include execution of a binary or script, or launching an application in which an object is processed, wherein launching should be interpreted as placing the application in an open state and, in some implementations, performing simulations of actions typical of human interactions with the application. For example, the application, an internet browsing application, may be processed such that the application is opened and actions such as "visiting" a website, downloading website pages, scrolling the website page, and activating a link from the website are performed.

The term "object" generally refers to a collection of data, whether in transit (e.g., over a network) or at rest (e.g., stored), often having a logical structure or organization that enables it to be categorized or typed for purposes of analysis. During analysis, for example, the object may exhibit a set of expected and/or unexpected features and, during processing, a set of expected and/or unexpected behaviors, which may evidence the presence of malware and potentially allow the object to be categorized or typed as malware. For example, an unexpected behavior of an object may include the generation of additional objects by an object being processed. In one embodiment, an object may include a binary file that may be executed within a virtual machine. Herein, the terms "binary file" and "binary" will be used interchangeably.

The term "file" is used in a broad sense to refer to a set or collection of data, information or other content used with a computer program. A file may be accessed, opened, stored, manipulated or otherwise processed as a single entity, object or unit. A file may contain other files, and may contain related or unrelated contents or no contents at all. A file may also have a logical format, and/or be part of a file system having a logical structure or organization of plural files. Files may have a name, sometimes called simply the "filename," and often appended properties or other metadata. There are many types of files, such as data files, text files, program files, and directory files. A file may be generated by a user of a computing device or generated by the computing device. Access and/or operations on a file may be mediated by one or more applications and/or the operating system of a computing device. A filesystem may organize the files of the computing device of a storage device. The filesystem may enable tracking of files and enable access of those files. A filesystem may also enable operations on a file. In some embodiments the operations on the file may include file creation, file modification, file opening, file reading, file writing, file closing, and file deletion.

The term "feature" may be understood to refer, collectively, to characteristics of an object that may be detected statically and behaviors manifested in response to the processing of the object. Characteristics may include information about the object captured without requiring execution or "running" of the object. For example, characteristics may include metadata associated with the object, including, anomalous formatting or structuring of the object. Features may also include behaviors, where behaviors include information about the object and its activities captured during its execution or processing. Behaviors may include, but are not limited to, attempted outbound communications over a network connection or with other processes (e.g. the operating system, etc.), patterns of activity or inactivity, and/or attempts to access system resources.

The term "network device" may be construed as any intelligent electronic device with the capability of connecting to a network. Such a network may be a public network such as the internet or a private network such as a wireless data telecommunication network, wide area network, a type of local area network (LAN), or a combination of networks. Examples of a network device may include, but are not limited or restricted to a network appliance, laptop, mobile phone, or server.

The term "ransomware," as described above, is a type of malicious software that is used to encrypt or otherwise prevent access to important information on a computer until payment (or "ransom") is paid to the ransomware owner. Ransomware may rely on a network connection to receive confirmation of ransom payment while some ransomware requires entry of an unlock code that may be provided by the Ransomware owner once the ransom is paid. Ransomware may be time bound, deleting content from the computer or rendering the content permanently inaccessible if ransom is not paid before expiration of the ransomware.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

Ransomware Protection System

FIG. 1 is an exemplary block diagram of an exemplary architecture of a ransomware protection system (RPS) 100 connected to an enterprise network 102. The RPS 100 includes at least an operating system 110, application(s) 120, and a ransomware protection application 130, the ransomware protection application further comprising at least an indicator scanner 140, an indicator store 145, a classification engine 160, and a protection logic 175. The RPS may be operationally located as a component of a real endpoint (e.g. a user operated computer, server, mobile device, etc.) or virtual endpoint (e.g., a virtual machine, etc.). In some embodiments the operating system 110 may be adapted to include an operating system monitoring logic 115 and/or the application(s) 120 may be adapted to include an application monitoring logic 125. In some embodiments the ransomware protection application 130 may further include a heuristics engine 150 and a user interaction logic 170.

Figure 3:
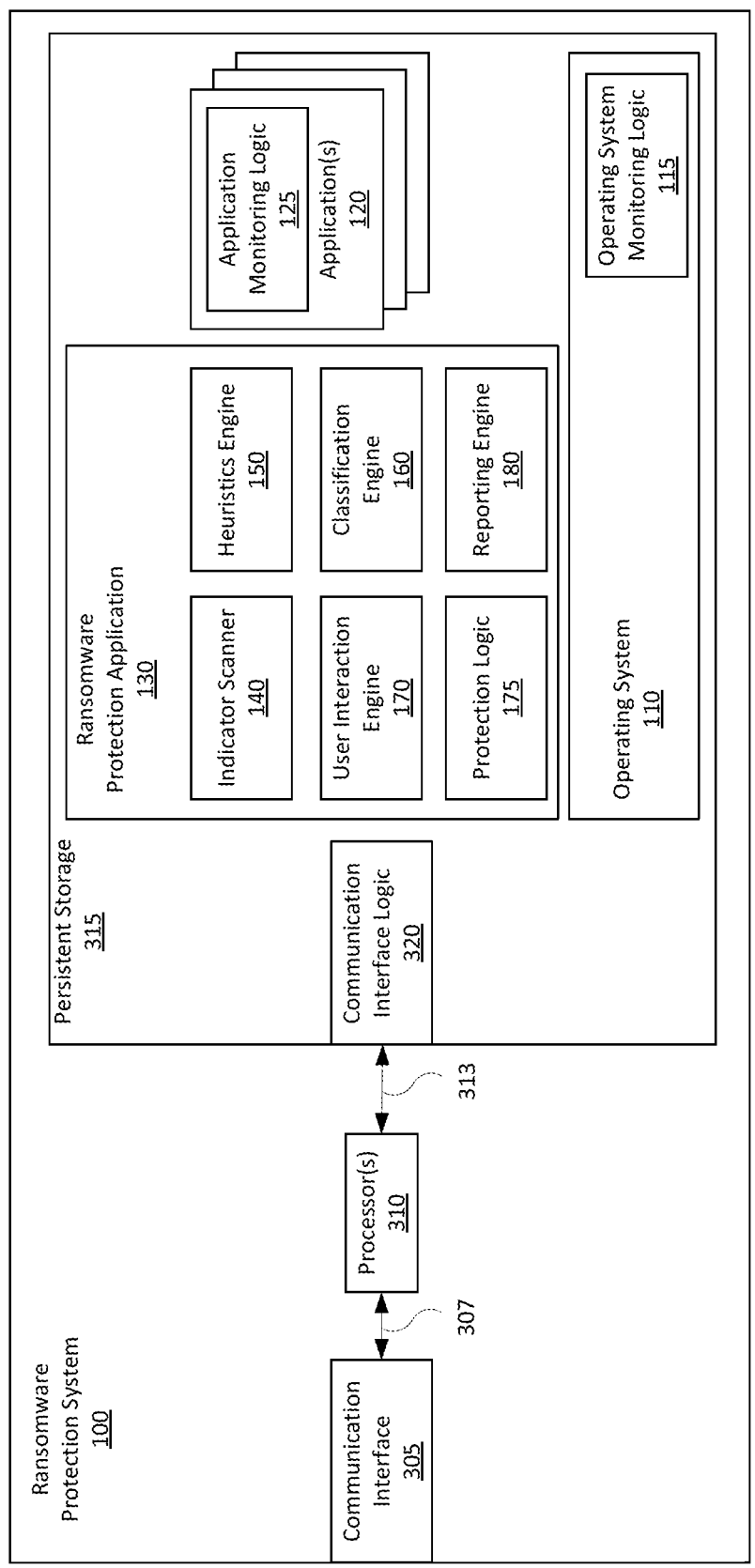
FIG. 3 is an exemplary embodiment of a logical representation of the ransomware protection system of FIG. 1.

Generally speaking, the ransomware prevention system (RPS) 100 may be implemented as one or more components executed by at least one electronic computing device where each includes physical hardware comprising hardware processor(s), network interface(s), a memory, and a system interconnect as shown in FIG. 3. Accordingly, each of the components of the RPS shown in FIG. 1 may be implemented as one or more computer programs executable by the one or more processors and stored in memory. The RPS may operate as processor executable software by coordinating the operation of an operating system monitoring logic, an application monitoring logic 125, and a ransomware prevention application (RPA) 130.

The RPA 130 may include an indicator scanner 140, an indicator store 145, a classification engine, a protection logic 175 and a reporting engine 180. In some embodiments, the RPA 130 may further include a heuristics engine 150 and/or a protection logic 175. The RPA receives from the monitoring logic, of the RPS 100, operating on a user-operated electronic computing device (i.e. an endpoint), one or more file access events ("analyzable events"). The RPA 130 receives analyzable events, the analyzable events including features associated with the attempted file access for analysis to determine if the analyzable event is associated with a ransomware cyber-attack. The RPA 130 provides the analyzable event, and associated features, the indicator scanner 140 for analysis.

The indicator scanner 140 receives features associated with attempted file accesses generates indicators associated with the features, and compares the features with known indicators (e.g., known indicators may comprise known characteristics and/or known behaviors of malware) to determine if the analyzable event associated with the indicators are known to be associated ransomware (or malicious behavior) or are known to be benign. The received analyzable events may be provided by the monitoring logic of the RPS 100. The monitoring logic may be adapted to operate with the operating system of the RPS 100, embodied as operating system monitoring logic 115, and/or in one or more applications 120, embodied as application monitoring logic 125. The known indicators are each associated with a previously encountered analyzable event known to be "benign" or "ransomware". In some embodiments, the indicator scanner 140 may be configured with a whitelist (indicators determined to be benign) and a blacklist (indicators determined to be associated with ransomware cyber-attacks).

The heuristics engine 150 applies heuristics and/or probability analysis to determine if the received file access events might include the hallmarks of ransomware. The heuristics engine 150 applies heuristics to the features of received events such as patterns of access, processing, etc. to determine a probability of being associated with ransomware. In some embodiments, the heuristics engine 150 may analyze the object indicated as a source of the file access event in coordination with a local malicious object analysis engine (not shown) or in coordination with remotely located malicious object analysis engines. The malicious object analysis engines may be located within an enterprise proprietary network or via an internet connect cloud network. The RPS 100 may provide to the malicious object analysis engine an object associated with the suspicious analyzable event and receive information associated with the maliciousness of the object. In some embodiments, the RPS 100 may receive an indicator associated with the classification to be retained in the indicator store 145. In some embodiments, the RPA 130 may prevent operation of the analyzable event until a response is received from the malicious object analysis engine.

When the determination of maliciousness of the attempted file access request is to be made by a separate service (i.e. a malicious object analysis engine), the RPA may temporarily determine the process requesting the attempted file access is to be treated as malicious (with the determination associated with features of the attempted file access event not stored in the known indicator store) and activate the protection logic, ending further execution of the process by the endpoint. Upon receipt from the separate service of an positive determination, by the separate malicious object analysis engine, of maliciousness of the process related to the attempted file access event, the indicators associated with the event are stored in the known indicator store in association with the determination and execution of the process continues to be blocked.

The heuristics engine 150 may be adapted to perform comparisons of an event and/or feature patterns under analysis against one or more pre-stored (e.g., pre-configured and/or predetermined) attack patterns stored in memory. The heuristics engine 150 may also be adapted to identify deviations in user file access patterns, the deviations determined through observation of user practices and experiential learning. Identified deviations from patterns of user file access are often a feature of ransomware cyber-attacks. The heuristics engine 150 may, in response to identifying patterns associated with ransomware generate a score indicative, to some level of probability, often well less than 100%, that the pattern is indicative of ransomware. The heuristics engine 150 may include a scoring logic to correlate one or more features, patterns of features of analyzable events associated with potential ransomware with known ransomware to generate a ransomware score. The generated ransomware score may be provided to the classification engine 160 for classification of the file access event as being associated with "ransomware" or "benign".

The classification engine 160 receives from the heuristics engine 150 information associated with a likelihood of the analyzable event being associated with ransomware. Where the classification engine 160 receives from the heuristics engine 150 a correlation of the analyzable event and features with known ransomware, the classification engine may determine a score by weighting each correlation with each feature separately, and combining the separate scores using weights based on the experiential knowledge of the system. The classification engine 160 may be configured to use the scoring information provided by the heuristics engine 150 to classify an analyzable event as being associated with ransomware or benign. In one embodiment, when the score is above a first threshold, the classification engine 160 may generate an alert that the analyzable event is associated with ransomware. When the score is greater than a second threshold but lower than the first threshold, the analyzable event may be provided to the user interaction logic 170 for a user (or security administrator) to determine if the analyzable event should be permitted to continue operation (the analyzable event should not be associated with malware and/or ransomware). When the score is less than the second threshold, the classification engine 160 may determine no further analysis is needed and the process generating the analyzable event may continue operation (i.e., the event is benign). The one or more thresholds may be fixed, modified by a security administrator, and/or modified based on operating conditions of the electronic device (for example, if an electronic device is experiencing repeated events or attempted access or executions by certain processes sharing a set of features, etc.). In some embodiments, the classification engine 160 may use only the correlation information provided by the heuristics engine 150.

The protection logic 175 receives a determination, from the classification engine 160 and/or the optional user interaction engine 170, of a ransomware cyber-attack in response to a file access event. The protection logic 175 may coordinate with corresponding protection logic adapted for the operating system 110 or in one or more application(s) 120. In some embodiments, the protection logic may coordinate the respective monitoring logic of the operating system 110 or of the one or more application(s) 120 to prevent the continued operation of the ransomware process. The protection logic 175 may direct the operating system 110 to end a process determined to be associated with a ransomware cyber-attack by invoking a system function. In some embodiments, the protection logic 175 may be configured to intercept system or application functions associated with ransomware cyber-attack and block their continued processing. The reporting engine 180 is adapted to receive information from the classification engine 160 and generate alerts that identify to a user, administrator, and/or a security analyst the likelihood of a ransomware cyber-attack associated with the file access event (also known as an analyzable event). In some embodiments, the alert may identify the object associated the file access event which has been associated with the ransomware cyber-attack. Other additional information regarding the ransomware object may optionally be included in the alerts. For example, an alert may include information associated with the affected user, information associated with the object, and targeted files (based features associated with the file access event).

The user interaction logic 170 provides for and receives user input by the user of the endpoint device. The user input received by the user interaction logic 170 may include instructions to permit, or not, the file access prompted by the process. The user interaction logic may present to the user of the endpoint device the capability to permit (or not) the file access on a "one-time" basis, on a continuous basis, and/or for specifically identified files or sets of files bearing certain characteristics (e.g. a shared filetype, creator, directory, etc.). The availability of certain capabilities to permit (or not) may be limited based on information received by the heuristics engine indicating a level of suspiciousness. In some embodiments, endpoint device user instructed permission grants may be provided to the reporting engine 180 and an alert issued to the system administrator. If an end endpoint device user does not permit file access permission to a process, the instruction is provided to the protection logic 175.

The RPA 130 operates by coordinating with monitoring logic of the endpoint device configured to monitoring the access of files on the endpoint (i.e. the protected device). File accesses on the endpoint may be related to a legitimate process (i.e. a user initiated process or an automatic and/or scheduled process effected during the normal operation of the endpoint) or an illegitimate process (i.e. operating to effect otherwise unsanctioned modifications to files on the system). The operating system monitoring logic 115, application monitoring logic 125, and ransomware protection application 130 may be included in the application during activation of the ransomware protection system 100. The application monitoring logic 125 may be configured to detect attempted file accesses by an application 120 and coordinate with the RPA 130 via communication of an event. The application monitoring logic 125 may detect attempted file accesses by monitoring the functions of the application (i.e. application programming interface (API) function calls, operating system function calls, etc.) during execution. If the application monitoring logic 125 detects an attempted access via a monitored function the monitoring logic generates an event, including features associated with the application 120 and its attempted file access, and issues the event to the RPA 130. Similarly, the operating system monitoring logic 115 monitors the processes associated with the execution of the operating system 110. The operating system monitoring logic 115 is configured to detect attempted file accesses by monitoring operating system function calls. The operating system monitoring logic 115, adapted to coordinate with the operating system 110, may collect information associated with the operating system function calls monitored by the monitoring logic (i.e. calling process, associated processes, owner of the process, function arguments, etc.).

The RPA coordinates with the monitoring logic of the electronic device (endpoint) to determine if illegitimate processes are operating on a file of the device. For example, in some embodiments, an operating system monitoring logic 115 is operates with the operating system 120 of the endpoint. By coordinating with the operating system 110 via the operating system monitoring logic 115, the RPA 130 may be alerted to a process attempting to access an operating system file (also referred to as a "system file") of the endpoint. Similarly, if an application is running on the endpoint and attempts to access a file, application monitoring logic 125 embedded in the application may be activated.

The operating system monitoring logic 115 and the application monitoring logic 125 of the ransomware protection system 100 identify behaviors (i.e. "observed behaviors") associated with the processing of an object which initiates a file access event (i.e. features associated with executing a process). The monitoring logics, in some embodiments, may also identify characteristics associated with the processing of the object initiating the file access event. The observed behaviors and identified characteristics are features associated with the file access event. During classification by the classification engine 160, features may be used to classify the even as part of a ransomware cyber-attack.

In some embodiments, the monitoring logic may alternatively or additionally, operate at a different level of the software stack—e.g. at a hypervisor level in a virtual runtime environment—to intercept or capture such requests for file access (which generate analyzable events). More specifically, an executing process may send an API call containing a file access request, which becomes an operating system call, which in some embodiments may become a hypercall. Detection of the file access event at the hypervisor level may enable the implementation of the RPA in a secure analysis environment for such embodiments.

The application monitoring logic 125 monitor the operation of the one or more applications 120. In some embodiments, the application monitoring logic 125 and/or the operating system monitoring logic 115 intercepts behaviors associated with the event for analysis by the ransomware protection application 130.

During processing of an object on an electronic device protected by the ransomware protection system 100, the operating system monitoring logic 115 application monitoring logic 125 identify behaviors associated with the ransomware cyber-attacks (e.g. attempted file accesses, etc.). Signaling from application(s) 120 may be monitored through intercept points (sometimes referred to as "hooks") to certain software calls (e.g., Application Programming Interface "API" call, library, procedure, function, or system call). The operations of the application may be monitored an intercept point (herein sometimes referred to as "instrumentation") in code closely operating with the application to detect a certain type of activity, which may include an activity prompting a particular software call. In some embodiments, the monitoring logic may be embodied as hooks or instrumentation associated with calls to an operating system 120 function. The observed behavior associated with the processing of the object may be provided to the ransomware protection application 130 for analysis and determination if the feature is associated with a ransomware cyber-attack.

The RPA 130 may operate on an enterprise network 102 connected electronic device, such as a user operated endpoint computer. The RPA may communicate through the enterprise network 102 via a communication interface 305. The communication interface 305 may connect to the enterprise network 102 via a direct network interface or indirectly via a virtual private network. The enterprise network 102 may connected to the endpoint ransomware protection 100 via a communication interface 305. The communication interface 305 may connect to the enterprise network 102 via a direct network interface or indirectly via a virtual private network.

Figure 2:
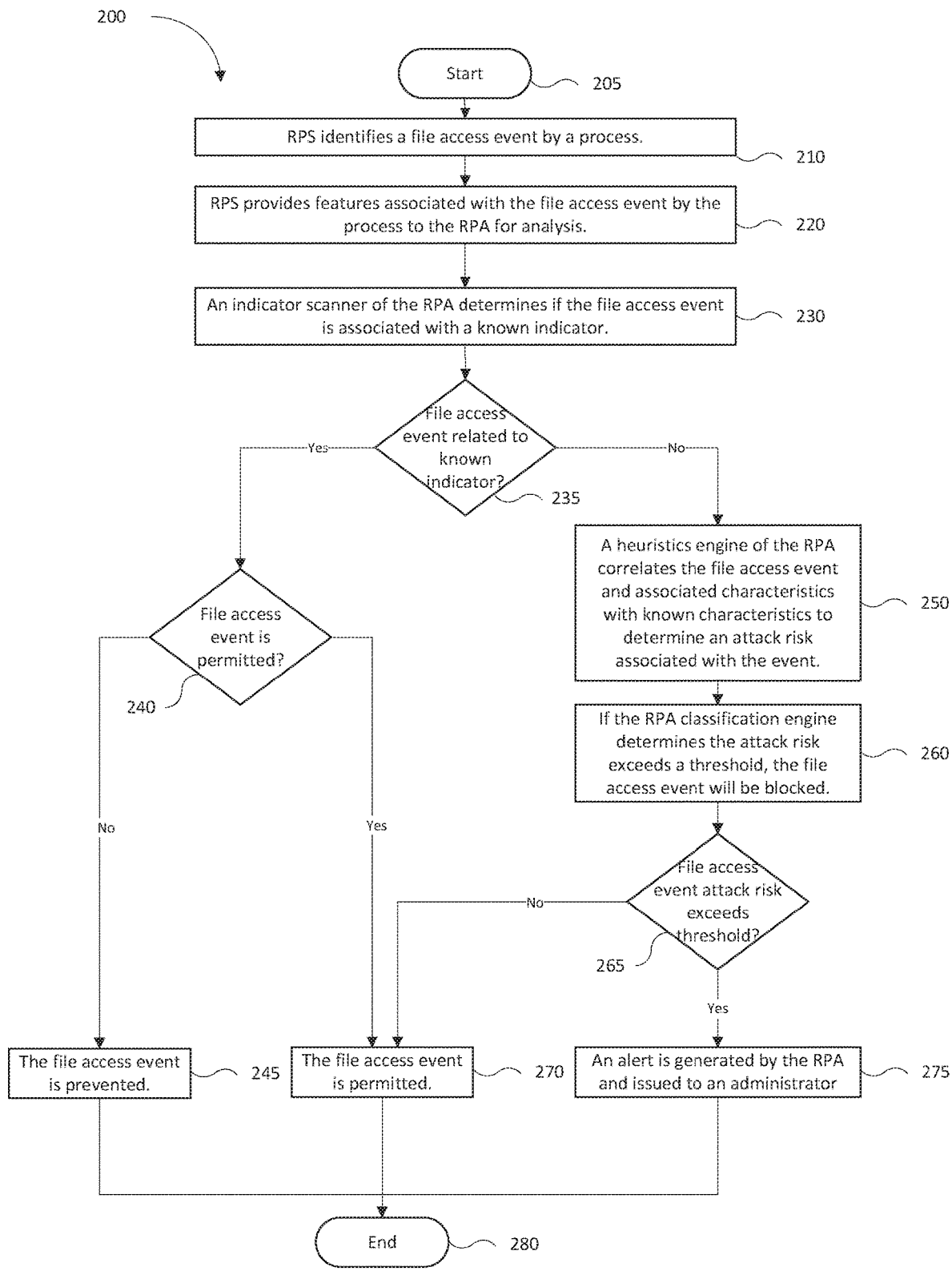
FIG. 2 is a flowchart illustrating an exemplary method for detecting, preventing, and reporting ransomware attacks by the RPS of FIG. 1.

Referring now to FIG. 2, a flowchart, illustrating an exemplary method for identifying ransomware operating on a computing device and preventing the cyber-attack by the ransomware protection system (RPS) 100. Each block illustrated in FIG. 2 represents an operation performed in the method 200 of detecting phishing cyber-attacks with the RPS 100. The method starts at step 205 and proceeds to step 210 wherein the RPS identifies a file access event via one or more of the monitoring logics (i.e. the operating system monitoring logic 115 and/or the application monitoring logic 125). The monitoring logics monitor the operation of application(s) 120 and/or the operating system 110 for processing of data which may be associated with a ransomware attack. The RPS 100 first identifies potential ransomware processes before analyzing to determine if the process is associated with ransomware. In some embodiments, a signal of a ransomware attack is a file access event. The determination of whether the event and associated features are part of a ransomware cyber-attack, is made by analyzing the event and associated features in a ransomware protection application 130 in step 220.

In step 230, the indicator scanner 140 receives the event and associated features for further analysis (i.e. the event and associated features having been allowed for further analysis by step 225. The indicator scanner 140 analyzes the received event and features and determines if they match an indicator associated with a known benign and/or ransomware process. In some embodiments the indicator scanner 140 may coordinate with an indicator store 145, the indicator store is communicatively coupled to the indicator scanner 140. In some embodiments, the indicator store 145 may be updated with updated indicators associated known benign and/or ransomware by coordinating communication via the communication interface 305 of the RPA 100. The communication interface 305 may be used to update the indicator store 145 via a connection to an enterprise network 102. In some embodiments the indicator store 145 may be modified in response to a determination of ransomware by the classification engine 160, the indicator store generating a new indicator in response to the classification and storing the generated indicator. If the indicator scanner 140 determines that the event and/or features detected by the monitoring logics is associated with a known indicator in step 235, the method proceeds to step 240. If the indicator scanner 140 does not determine the event and/or features are known (i.e. not associated with a known benign or ransomware sample) the system proceeds to step 250. In some embodiments the indicator scanner 140 may provide a determination of whether or not the event and/or features are associated with a known benign or ransomware event to the classification engine 160 of the RPA 130.

In step 240, the indicator scanner 140 relays to the classification engine if the known association (i.e. benign or ransomware) is permissible. If the indicator scanner determines that the event and/or features are not permissible the indicator scanner will indicate to the protection logic 175 the associated event should be prevented in step 245. Alternatively, if the indicator scanner determines the event and/or features are permissible, the event will be permitted proceed without further intervention in step 270. For example, if the indicator scanner identifies the features of the file access event detected by the monitoring logics to be associated with known ransomware the indicator scanner may determine, in step 240, that the file access event is not permissible and prevent its further processing in step 245. In some embodiments, the protection logic may receive from the classification engine 160 a determination as to whether or not the event and/or features are permissible or should be prevented by the protection logic 175 in response to determination of association with an indicator by the indicator scanner 140.

In step 245 the protection logic 175 of the RPA 130 prevents further processing of the ransomware. The protection logic 175 may coordinate with protection logic of the operating system 110 or in the application(s) 120 to effect prevention of ransomware on the RPS 100. The protection logic may indicate to the operating system 110 to stop processing objects associated with a ransomware process (as determined by the classification engine 160). In some embodiments the protection logic 175 may intercept and block processing of associated processes with a particular file access event. Similarly, the API functions of an application may be used to effect prevention by ending the requested file access. When the protection logic 175 is initiated, an alert is generated and issued to an administrator in step 275.

The process continues in step 275 wherein, the reporting engine 180 receives information from the protection logic 175 and generates alerts issued via the communication interface 305 that identify to an administrator the information associated with the detected ransomware cyber-attack. The information provided by the alert may include, in part, information associated with the originating process, as well as the user associated with the ransomware. Additional information regarding the ransomware object (the object associated with the identified ransomware cyber-attack) may optionally be included in the alerts. The reporting engine 180 may also provide connected network security systems with updated information regarding ransomware attacks and the associated file access event and/or features do not represent a ransomware cyber-attack, the reporting engine 180 may alert an administrator via an alert, while in alternative embodiments the reporting engine will not issue an alert. Once step 275 is complete, the ransomware prevention procedure concludes at step 280.

Meanwhile, if in step 240 the indicator scanner 140 determines that file access event is not permissible the protection logic is bypassed by the classification engine and the file access event is permitted to proceed and receive the required access without further intervention by the RPA 130. In some embodiments, the indicator scanner 140 provides the determination to the classification engine 160, while in other embodiments the classification engine receives a determination of whether or not the indicator is associated with ransomware or is benign and determines if the process is permissible.

If, in step 235, the indicator scanner 140 does not determine that the event and/or features associated with the event have been previously seen (i.e. are stored in the indicator store 145) the process proceeds to step 250 where the event and/or its associated features are provided to a heuristics engine 150 for further analysis. The heuristics engine 150 receives the event and/or features associated with the event and applies heuristics, rules or other conditions to the features to identify anomalous or unexpected behaviors which may be associated with ransomware. The analysis of the heuristics engine may yield an association between a set of one or more features and/or the event and a likelihood of association with ransomware. This likelihood of association with ransomware may be provided to a classification engine 160 for ransomware classification in step 260.

In step 260 the classification engine 160 receives from the heuristics engine 150 a likelihood of association with ransomware of the monitored features and/or file access event. In some embodiments the classification engine may receive an association with known ransomware or benign indicators from the indicator scanner 140. The classification engine 160 determines, based on the received information associated with each file access event whether or not it is associated with ransomware. If the classification engine 160 determines the event is associated with ransomware because the likelihood of association with ransomware exceeds a first threshold, the event will be determined and labelled as "ransomware" in step 265. Meanwhile, in some embodiments, if the likelihood of association with ransomware is below a second threshold, the event may be determined and labelled to be "benign". If the association with ransomware is not labelled "benign" or "ransomware", the event may, in some embodiments be labelled as "suspicious". Suspicious events may be provided to a user interaction logic 170 for classification by a user. Based upon the user in response to an alert generated by the user interaction engine 170, the event will be classified as ransomware or benign. File access events determined to be benign by the classification engine 160 or the user interaction logic 170 may be permitted to receive access to the file requested in step 270. Meanwhile, in some embodiments, suspicious events may be prevented. Prevented events (including events classified as ransomware and in some embodiments, suspicious events) are provided to the reporting engine 180 in step 275 and in some embodiments to the protection logic 175. The process continues in step 275 as described above.

In step 220, the RPA receives from one or more monitoring logics the file access event and any associated features. The inventors recognize certain hallmarks of ransomware (or other malware rendering files maliciously encrypted, deleted or otherwise inaccessible) may be used as features for the classification of cyber-attacks as ransomware. The features may include, for example, details of the attempted file access (e.g., number of files accesses, file type of file(s) accessed, a process ID, process parent history, etc.), calling process history (i.e. is the calling process associated with another process, was the calling process directed by user-input, etc.), and/or whether there is an association with a user interface (i.e. did a user initiate the process via a Graphical User Interface which generated the analyzable event). Additional information which may be included as features are statistics related to the characteristics of the attempted file access event. The RPA 130 may use determine whether or not a file access event will be analyzed for ransomware protection based on the associated features of the object in step 220, alternatively, the procedure may proceed directly to step 230.

FIG. 3 is an exemplary embodiment of a logical representation of the ransomware protection system 100 of FIG. 1. The ransomware protection system 100, in an embodiment may include a housing, which is made entirely or partially of a hardened material (e.g., hardened plastic, metal, glass, composite or any combination thereof) that protects the circuitry within the housing, namely one or more processors 310 that are coupled to a communication interface 305 via a first transmission medium 307. The communication interface 305, in combination with a communication interface logic 320, enables communications with external network devices and/or other appliances via a network to receive updates for the ransomware prevention system 100. According to one embodiment of the disclosure, the communication interface 305 may be implemented as a physical interface including one or more ports for wired connectors. Additionally, or in the alternative, the communication interface 305 may be implemented with one or more radio units for supporting wireless communications with other electronic devices. The communication interface logic 320 may include logic for performing operations of receiving and transmitting one or more objects via the communication interface 305 to enable communication between the ransomware protection system 100 and network devices via a network (e.g., the internet) and/or cloud computing services.

The processor(s) 310 is further coupled to a persistent storage 315 via a second transmission medium 313. According to one embodiment of the disclosure, the persistent storage 315 may include a communication interface logic 320, an operating system 110, an operating system monitoring logic 115, application(s) 120, application monitoring logic 125, a ransomware protection application 130, an indicator scanner 140, a classification engine 160, a protection logic 175 and a reporting engine 180, as well as an optional heuristics engine 150 and/or a user interaction engine 170. When implemented as hardware, one or more of these logic units could be implemented separately from each other.

In the foregoing description, the invention is described with reference to specific exemplary embodiments thereof. It will, however, be evident that various modifications and changes may be made thereto without departing from the broader spirit and scope of the invention as set forth in the appended claims.

What is claimed is:

1. A system to detect and prevent ransomware cyber-attacks on a computer, the system comprising:
one or more processors; and
a storage device communicatively coupled to the one or more processors, the storage device to store a plurality of logic modules for execution by the one or more processors, the plurality of logic modules include an indicator scanner, a classification engine, a protection logic, an user interaction logic, and a reporting engine, wherein,
the indicator scanner is configured to receive an analyzable event in response to at least one attempted file access by a process and extract features from the analyzable event relating to the at least one attempted file access and the process,
the classification engine is configured to (i) receive the extracted features, (ii) compare the features with a set of known indicators associated with determinations of a cyber-attack to generate a maliciousness score based on a correlation between the extracted features and the set of known indicators, and (ii) classify the analyzable event as either (a) malicious when the maliciousness score exceeds a first threshold or (b) non-malicious when the maliciousness score fails to exceed a second threshold,
the user interaction logic is configured to (i) receive the analyzable event in response to the maliciousness score having a value between the first threshold and the second threshold and (ii) provide a classification of the analyzable event to the classification engine where the classification is based on a determination by a user or administrator as to whether the analyzable event is malicious,
the protection logic is configured to prevent continued execution of the process in response to the classification engine classifying the analyzable event as malicious, and
the reporting engine is configured to generate and issue an alert in response to the classification of the analyzable event as malicious.

2. The system of claim 1, wherein the plurality of logic modules further comprising monitoring logic that, when executed by the one or more processors, monitors one or more processes including the process, generates the analyzable event in response to the at least one attempted file access by the process, and provides the analyzable event to the indicator scanner analysis.

3. The system of claim 2, wherein the monitoring logic comprises at least one of an operating system monitoring logic interoperable with an operating system of the computer for monitoring for attempted access requests therefrom, and an application monitoring logic interoperable with at least one application operating on the computer for monitoring for attempted access requests therefrom.

4. The system of claim 1, wherein the analyzable event is deemed to be malicious when the analyzable event is associated with a cyber-attack.

5. The system of claim 1, wherein the protection logic is further configured to: extract from the analyzable event a process identifier (ID) as a first feature, and prevent execution of the process associated with the malicious analyzable event by signaling the processor to stop execution of the process identified by the process ID.

6. The system of claim 1, wherein the analyzable event is deemed to be malicious when the process is associated with a cyber-attack.

7. The system of claim 6, wherein the cyber-attack is a ransomware cyber-attack.

8. The system of claim 1, wherein the first threshold is greater in score value than the second threshold.

9. The system of claim 1, wherein the protection logic is operationally located in a hypervisor hosting at least one virtual environment provisioned as the computer and utilizing at least the protection logic and the indicator scanner.

10. The system of claim 1, wherein the reporting engine, when executed by the one or more processors, generates and issues the alert in response to receiving, from the protection logic, information specifying the process associated with the classification of malicious was prevented from continued execution.

11. The system of claim 1, wherein the reporting engine, when executed by the one or more processors, generates the alert via a graphical user interface for an administrator to classify the analyzable event as being associated with a malicious process in response to the comparison.

12. The system of claim 1, wherein the classification engine to compare the features with the set of known indicators being associated with known indicators of ransomware to classify the features of the analyzable event as ransomware or not.

13. The system of claim 1, wherein the one or more processors are one or more hardware processors.

14. A computerized method for detecting a ransomware cyber-attack on a computer, the method comprising:
capturing one or more attempted file access requests by monitoring execution of a process by the computer and generating an analyzable event;
extracting features associated with the analyzable event;
examining the extracted features with features associated with known malicious indicators associated with ransomware or known benign indicators for classifying the analyzable event as a malicious event, the examining of the extracted features includes generating a maliciousness score based on a correlation of the extracted features with the known malicious indicators;
classifying the analyzable event as either the malicious event when the maliciousness score satisfies a first threshold or a non-malicious event when the maliciousness score fails to satisfy a second threshold;
classifying, by a user or administrator, whether the analyzable event corresponds to the malicious event or the non-malicious event when the maliciousness score has a value between the first threshold and the second threshold;
preventing further operations by the process of the computer in response to the analyzable event being classified as a malicious event; and
generating and issuing an alert to an administrator in response to classifying the analyzable event as a malicious event.

15. The method of claim 14, further comprising:
requiring user input of a computer user as to maliciousness, in response to detecting a filetype associated with the event.

16. The system of claim 14, wherein the preventing of further operations by the process of the computer comprises extracting from the analyzable event a process identifier (ID) as a first feature, and preventing execution of the process associated with the malicious analyzable event by signaling the processor to stop execution of the process identified by the process ID.

17. The method of claim 14, wherein the examining of the exacted features associated with the known malicious indicators or features associated within known benign indicators comprises generating the maliciousness score in response to a correlation of the extracted with the known malicious indicators associated with ransomware, the maliciousness score being used to classify the analyzable event as ransomware.

18. The method of claim 17, wherein the analyzable event is determined to be ransomware in response to the maliciousness score exceeding a first threshold.

19. The method of claim 14, wherein the preventing further operations by the process of the computer is performed by protection logic operationally located in a hypervisor hosting at least one virtual environment provisioned as the computer.

20. The method of claim 14, wherein the generating and issuing of the alert to the administrator occurs in response to receiving information specifying the process being classified as the malicious event was prevented from continued execution.

21. A non-transitory computer readable medium including software that, upon execution by one or more processors, performs operations to determine a presence of ransomware, the medium comprising:
an indicator scanner configured to receive an analyzable event in response to at least one attempted file access by a process and extract features from the analyzable event relating to the at least one attempted file access and the process;
a classification engine configured to (i) receive the extracted features, (ii) compare the features with a set of known indicators associated with determinations of a cyber-attack to generate a maliciousness score based on a correlation between the extracted features and the set of known indicators, and (ii) classify the analyzable event as either (a) malicious when the maliciousness score exceeds a first threshold or (b) non-malicious when the maliciousness score fails to exceed a second threshold
a user interaction logic configured to provide, based on an input by a user or administrator, a classification of the analyzable event to the classification engine, the classification being based on a determination by the user or administrator as to whether the analyzable event is malicious;
a protection logic configured to prevent, in response to the classification engine or the user interaction logic classifying the analyzable event as malicious, continued execution of the process by the one or more processors; and
a reporting engine configured to generate and issue an alert in response to the classification of the analyzable event as malicious.

22. The non-transitory computer readable medium of claim 21, wherein the protection logic is further configured to extract from the analyzable event a process identifier (ID) as a first feature, and prevent execution of the process associated with the malicious analyzable event by signaling the processor to stop execution of the process identified by the process ID.

23. The non-transitory computer readable medium of claim 21, wherein the analyzable event is deemed to be malicious when the process is associated with a cyber-attack.

24. The non-transitory computer readable medium of claim 23 wherein the cyber-attack is a ransomware cyber-attack.

25. The non-transitory computer readable medium of claim 21 wherein the protection logic is operationally located in a hypervisor hostig at least one virtual environment including the protection logic and the indicator scanner.

26. The non-transitory computer readable medium of claim 21, wherein the reporting engine, when executed by the one or more processors, generates and issues the alert in response to receiving, from the protection logic, information specifying the process associated with the classification of malicious was prevented from continued execution.

* * * * *